(12) United States Patent
Saito

(10) Patent No.: US 12,387,529 B2
(45) Date of Patent: Aug. 12, 2025

(54) IMAGE PROCESSING APPARATUS, METHOD, AND STORAGE MEDIUM FOR DETECTING ACTION OF A PERSON IN VIDEO IMAGES BASED ON AN OPTIMAL DIRECTION FOR DETECTING A MOTION IN PREDICTED ACTIONS OF A PERSON

(71) Applicant: CANON KABUSHIKI KAISHA, Tokyo (JP)

(72) Inventor: Sho Saito, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 18/312,668

(22) Filed: May 5, 2023

(65) Prior Publication Data
US 2024/0005699 A1 Jan. 4, 2024

(30) Foreign Application Priority Data
May 18, 2022 (JP) ................. 2022-081817

(51) Int. Cl.
*G06V 20/52* (2022.01)
*G06T 7/70* (2017.01)
*G06V 10/94* (2022.01)
*G06V 40/20* (2022.01)

(52) U.S. Cl.
CPC ............... *G06V 40/20* (2022.01); *G06T 7/70* (2017.01); *G06V 10/94* (2022.01); *G06T 2207/20076* (2013.01); *G06T 2207/30196* (2013.01); *G06T 2207/30244* (2013.01)

(58) Field of Classification Search
CPC .............................. H04N 5/247; G06V 20/52
See application file for complete search history.

(56) References Cited

U.S. PATENT DOCUMENTS

| | | | | |
|---|---|---|---|---|
| 5,729,471 | A * | 3/1998 | Jain ...................... | H04N 5/2627 348/E13.058 |
| 6,359,647 | B1 * | 3/2002 | Sengupta ......... | G08B 13/19641 348/E7.086 |
| 10,063,843 | B2 | 8/2018 | Yano et al. | |
| 11,178,363 | B1 * | 11/2021 | Qian ...................... | G06V 20/52 |
| 2008/0129825 | A1 * | 6/2008 | DeAngelis ........... | H04N 23/661 348/E7.086 |
| 2010/0002082 | A1 * | 1/2010 | Buehler ........... | G08B 13/19645 348/E7.085 |
| 2012/0314914 | A1 * | 12/2012 | Karakotsios ......... | G06V 40/193 382/118 |
| 2013/0266181 | A1 * | 10/2013 | Brewer ................ | G06V 40/173 382/103 |
| 2017/0262706 | A1 * | 9/2017 | Sun ...................... | H04N 21/231 |

(Continued)

FOREIGN PATENT DOCUMENTS

| | | |
|---|---|---|
| JP | 2017-059945 A | 3/2017 |
| JP | 2021-096702 A | 6/2021 |

*Primary Examiner* — Frank Johnson
(74) *Attorney, Agent, or Firm* — Cowan, Liebowitz & Latman, P.C.

(57) ABSTRACT

An image processing apparatus according to one aspect of the present invention predicts the next action of a person who has been detected from an image captured by an image capturing apparatus, and selects an optimal image capturing apparatus for detecting the action of the person from among the plurality of image capturing apparatuses based on the predicted action.

20 Claims, 19 Drawing Sheets

(56) References Cited

U.S. PATENT DOCUMENTS

| | | | | |
|---|---|---|---|---|
| 2018/0018508 A1* | 1/2018 | Tusch | .................... | G06V 20/52 |
| 2018/0077345 A1* | 3/2018 | Yee | ........................ | H04N 23/69 |
| 2018/0247505 A1* | 8/2018 | Arai | ........................ | G06V 40/10 |
| 2019/0371134 A1* | 12/2019 | Chen | .................... | G06V 40/103 |
| 2021/0129871 A1* | 5/2021 | Malla | ........................ | G06T 7/70 |
| 2021/0409655 A1* | 12/2021 | Kerst | ...................... | G06T 7/593 |
| 2022/0122275 A1* | 4/2022 | Carranza | ................ | G06V 20/52 |
| 2022/0254052 A1* | 8/2022 | Sekii | ........................ | G06T 7/50 |

* cited by examiner

FIG. 2

| TRACKING ID | TRACKING RECTANGLE CENTRAL COORDINATES (X) | TRACKING RECTANGLE CENTRAL COORDINATES (Y) | TRACKING RECTANGLE SIZE (WIDTH) | TRACKING RECTANGLE SIZE (HEIGHT) |
|---|---|---|---|---|
| ... | | | | |
| 100 | 100 | 50 | 30 | 30 |
| 101 | 300 | 200 | 50 | 60 |
| 102 | 500 | 400 | 60 | 70 |
| 103 | 520 | 430 | 70 | 80 |
| ... | | | | |

FIG. 4A

| DETECTION CANDIDATE ACTION | IDEAL PERSON ORIENTATION | PROBABILITY OF OCCURRENCE (%) |
|---|---|---|
| ... | | |
| CHECKING SURROUNDINGS ACTION | FRONT | 40 |
| REACHING OUT A HAND | SIDE | 30 |
| CROUCHING DOWN | SIDE | 20 |
| ... | | |

FIG. 4B

| IDEAL PERSON ORIENTATION | PROBABILITY OF OCCURRENCE (%) |
|---|---|
| ... | |
| FRONT | 40 |
| SIDE | 50 |
| ... | |

FIG. 5

| TRACKING ID | PERSON BODY DETECTION LIKELIHOOD | NOSE COORDINATES (X) | NOSE COORDINATES (Y) | NOSE DETECTION LIKELIHOOD | LEFT EYE COORDINATES (X) | ... |
|---|---|---|---|---|---|---|
| 100 | 0.8 | 115 | 55 | 0.7 | 120 | ... |
| 101 | 0.7 | 225 | 210 | 0.6 | 235 | ... |
| 102 | 0.5 | 530 | 420 | 0.4 | 545 | ... |
| 103 | 0.7 | 535 | 450 | 0.6 | 550 | ... |

(K)  (L)  (M)

IMAGE PROCESSING APPARATUS, METHOD, AND STORAGE MEDIUM FOR DETECTING ACTION OF A PERSON IN VIDEO IMAGES BASED ON AN OPTIMAL DIRECTION FOR DETECTING A MOTION IN PREDICTED ACTIONS OF A PERSON

BACKGROUND OF THE INVENTION

Field of the Invention

The present invention relates to an image processing apparatus, an image processing method, a program storage medium, and an image processing system.

Description of Related Art

There is a demand for detecting the actions of people in stores for marketing purposes, and the like. As a method for detecting the actions of people, there is a method that detects and tracks a person from an image of a monitoring camera, estimates the position of each body part of the person by performing posture estimation for each tracked person, and performs the detection of a person's actions based on the chronological changes in the posture estimation results. In this context, in order to detect a person's actions, it is necessary to predict the positions of a plurality of body parts with a high accuracy. It is therefore preferable that images are captured of each body part of the person in a state in which it is not hidden, and in which the image is not blurry, and therefore, there is a method that captures images of the person using a plurality of cameras and reduces the influence of body parts being hidden or blurred.

Japanese Unexamined Patent Application, First Publication No. 2017-059945, captures images of the individual body parts of a person using a plurality of cameras, and detects the person's actions after associating these body parts as one human body. It is thereby possible to detect the actions of a person even if a certain body part of this person is hidden from a certain camera, if it is possible to capture an image of that body part with another camera. In Japanese Unexamined Patent Application, First Publication No. 2021-096702, the actions of a person are detected after extracting a feature amount from each body part of which an image has been captured by a plurality of cameras, and averaging the feature amount for each body part. Thereby, even if a body part is hidden or blurred in a specific camera image, and an error occurs in the feature amount, this is averaged with the feature amount for other camera images in which an image of this body part was able to be captured, and therefore, the effects of a body part being hidden or blurred can be reduced.

SUMMARY OF THE INVENTION

One aim of the present invention is to reduce the processing load for detecting the actions of a person.

The image processing apparatus according to one aspect of the present invention predicts actions of a person who has been detected from an image captured by an image capturing apparatus, selects an optimal image capturing device for detecting actions of this person from among a plurality of image capturing apparatuses based on these predicted actions, and detects actions of the person based on an image that has been captured by the optimal image capturing apparatus.

Further features of the present invention will become apparent from the following description of exemplary embodiments with reference to the attached drawings.

BRIEF DESCRIPTION OF THE DRAWINGS

FIG. 2 is a diagram showing one example of tracking results in an embodiment.

FIG. 4A to FIG. 4B are diagrams showing one example of prediction results for a person's actions in an embodiment.

FIG. 5 is a diagram showing one example of pose estimation results in an embodiment.

DESCRIPTION OF THE EMBODIMENTS

Figure 1:
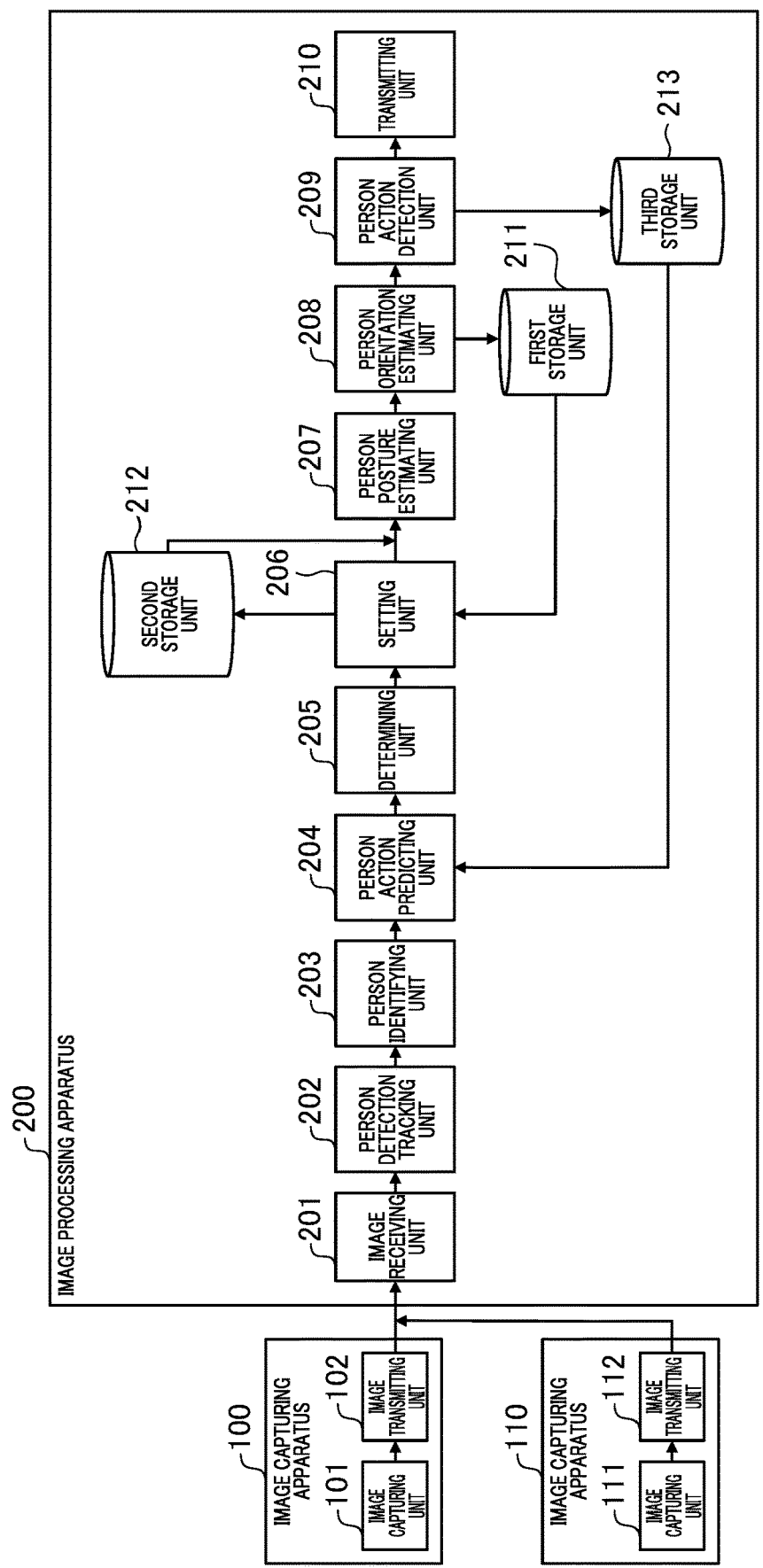
FIG. 1 is a block diagram of the configuration of an image processing system in an embodiment.

Below, embodiments will be explained in detail with reference to the attached drawings. Note that the following embodiments do not limit the inventions according to the claims. Although a plurality of characteristics is described in the embodiments, the present invention is not limited to inventions for which the entirety of this plurality of characteristics are indispensable to the invention, and in addition, the plurality of characteristics may also be arbitrarily combined. Furthermore, in the attached drawings, the same reference numerals are attached to the same or similar configurations, and redundant explanations are omitted.

The First Embodiment shows, as one example of a monitoring system, an example of a configuration of a system in which a camera has been disposed in a small business such as a convenience store or the like, and when a predetermined person action has been detected, a detection event is transmitted to a separate system. The predetermined person action is, for example, reaching out their hand, crouching down, turning their head and confirming their surroundings, or the like.

FIG. 1 is a diagram showing a configuration of an image processing system according to the First Embodiment. FIG. 2 is a diagram showing one example of tracking results in the First Embodiment.

The image processing system in the First Embodiment is configured by an image capturing apparatus 100, an image capturing apparatus 110, and an image processing apparatus 200. The image capturing apparatus 100 and the image capturing apparatus 110 are cameras, and in the First Embodiment, it is assumed that there is a plurality of these disposed inside of a store, and that they are disposed in positions from which they can capture images of the staff and customers. The image capturing apparatus 100, the image capturing apparatus 110, and the image processing apparatus 200 are connected via a communications network. Specifically, they are connected by a computer network such as a wired LAN, a wireless LAN, or the like. LAN is an abbreviation of Local Area Network.

The image capturing apparatus 100 includes an image capturing unit 101 and an image transmitting unit 102. The image capturing unit 101 is configured by an image capturing lens, image capturing sensors such as a CCD, a CMOS, and the like, a signal processing unit, and the like. The images that have been capturing by the image capturing unit 101 are transmitted to the image transmitting unit 102 at predetermined time intervals.

The image transmitting unit 102 confers additional information such as each type of information for the image capturing apparatus 100, the time, and the like to the images that have been transmitted from the image capturing unit 101, converts them to data that is transmittable on the network, and transmits them to the image processing apparatus 200.

The image capturing apparatus 110 includes an image capturing unit 111 and an image transmitting unit 112. The image capturing unit 111 is the same as the image capturing unit 101, and the image transmitting unit 112 is the same as the image transmitting unit 102, and descriptions thereof will therefore be omitted. In addition, it is preferable that the image capturing apparatus 110 is disposed in a different position than the image capturing apparatus 100, that is, in a position in which it is able to capture images from a different direction than the image capturing apparatus 100.

The image processing apparatus 200 is configured to include each functional unit of an image receiving unit 201, a person detection tracking unit 202 (referred to below as a tracking unit 202), a person identifying unit 203, a person action predicting unit 204, a determining unit 205, and a selecting unit 206. Furthermore, the image processing apparatus 200 is configured to include each functional unit of a person posture estimating unit 207, a person orientation estimating unit 208, a person action detecting unit 209 (referred to below as a detecting unit 209), a transmitting unit 210, a first storage unit 211, a second storage unit 212, and a third storage unit 213.

The image receiving unit 201 receives data that has been transmitted from the image capturing apparatus 100 and the image capturing apparatus 110, extracts images (image information) from this data, and transmits these to the tracking unit 202. In this context, in the First Embodiment, the images to be extracted are, for example, frame images (frames).

The tracking unit 202 performs tracking processing that associates the detection processing of people in the images that have been extracted by the image receiving unit 201 and the people who have been detected between images. The tracking unit 202 calculates tracking results (tracking information) by performing person extraction processing and tracking processing. The tracking unit 202 transmits these images and the tracking results to the person identifying unit 203 and the person posture estimating unit 207.

The detection processing that is performed by the tracking unit 202 is processing that, for example, extracts a person's position in an image using machine learning. A position expresses the central coordinates of a rectangle surrounding a person, and the width and the height of the rectangle, wherein in the First Embodiment, the origin of the rectangle is the upper left side of the image.

The tracking processing that the tracking unit 202 performs is processing that associates people that have been detected between continuous images. Association for the people detected from each image is performed using the length of the line segments that connect the central coordinates of rectangles surrounding the people in each of the continuous images, the change amounts for the width and height of the rectangles, and the predicted positions of the people that have been obtained by past tracking processing, and a tracking ID is conferred to each person. The tracking IDs are conferred so as to enable identifying the same person in a sequence. By this tracking processing, the same tracking ID as in past frames is conferred to people who have already been detected in past frames. In contrast, new tracking IDs are conferred to people who have been newly detected. The tracking results that are calculated by the tracking unit 202 include information such as a tracking ID, and the central coordinates, the width, and the height of the rectangle that surrounds a person, as is shown in FIG. 2

The person identifying unit 203 performs processing (identification processing) that identifies the same person between images that have been captured by the plurality of image capturing apparatuses based on the images that have been captured by the plurality of image capturing apparatuses and the tracking results that have been output from the tracking unit 202. Although in the First Embodiment, two image capturing apparatuses, the image capturing apparatus 100 and the image capturing apparatus 110, are used, the number is not limited thereto, and three or more image capturing apparatuses may also be used. The person identifying unit 203 first extracts each feature amount for the people who have been image captured by each of the image capturing apparatuses (the image capturing apparatus 100, and the image capturing apparatus 110) in order to identify them. The feature amounts for the people use one or more of a face, a head, clothing, or the like. The extracted feature value is saved in the person identifying unit 203. After this, the person identifying unit 203 compares the extracted feature values between the image capturing apparatuses, and in the case in which the degree of similarity is at or above a certain amount (at or above a predetermined threshold), determines that this is the same person. Although in the First Embodiment, for example, the cosine degree of similarity is used as the degree of similarity for the feature amounts, the invention is not limited thereto.

The person action predicting unit 204 predicts the next movement for each person that the tracking unit 202 has detected, and calculates movement prediction results. The person action predicting unit 204 outputs the calculated movement prediction results to the determining unit 205.

During the calculation of the movement prediction results, the person action predicting unit 204 first reads out the past movement detection results from the third storage unit 213. Next, a number of occurrences for each movement in each image capturing apparatus and a movement detection history for each person is saved inside the person action predicting unit 204 based on the past action detection results that have been read out. Next, with respect to each detection candidate action, the person action predicting unit 204 calculates the probability of occurrence for each person, and calculates the movement prediction results for each person.

The number of occurrences for each action in each image capturing apparatus, and the movement detection history for each person, and the like are used in the calculation of the probability of occurrence. For example, the number of occurrences for each action in each of the image capturing apparatuses is counted, and the probability of occurrence for actions with a high number of occurrences is raised. In addition, the orders of people's actions are set as action rules, and the probability of occurrence for the next action in the action rules is raised in the case in which a certain action has occurred. The action rules set rules in advance, such as, for example, that after an action of checking surroundings has been detected, there is a high possibility that a hand reaching out will be detected. In addition, the same type of rules may also be found and set by using machine learning based on the action detection history for each person. In the predictions that follow this, in the case in which the action of checking their surroundings has been detected for a certain person, the probability of occurrence for their hand reaching out is raised when action prediction is performed for this person.

In this context, a person orientation in each captured image from the plurality of image capturing apparatuses will be explained using FIG. 3. FIG. 3 are diagrams showing one example of an overhead view of a store and images captured by a plurality of image capturing apparatuses in the First Embodiment. In the example in FIG. 3, an image capturing apparatus 302, an image capturing apparatus 303, and an image capturing apparatus 304 each capture images in the central direction of the diagrams from different positions (different directions).

Figure 3A:
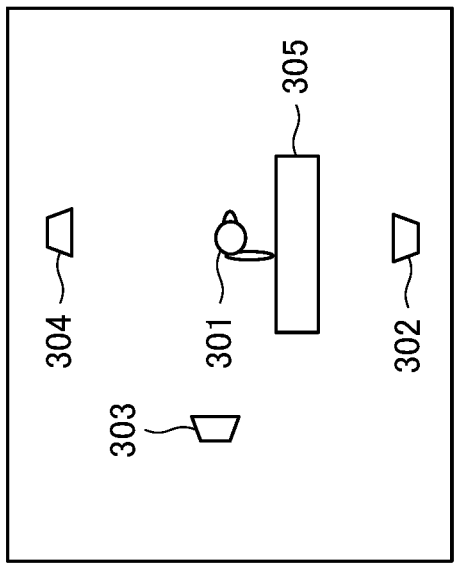
FIG. 3A to FIG. 3D are diagrams showing one example of an overhead view of a store and a captured image in an embodiment.

FIG. 3A is an example of an overhead view diagram of a store. FIG. 3B shows one example of a captured image of the image capturing apparatus 302. The image in FIG. 3B is an image that was captured from the frontal orientation of a person 301. It can be further confirmed from the image shown in FIG. 3B that the person 301 is reaching their right hand towards a product shelf 305, and that the lower half of the person 301's body is hidden by the product shelf 305. FIG. 3C is a diagram showing one example of a captured image of the image capturing apparatus 303. The image in FIG. 3C is an image that was captured from a sideways orientation of the person 301. Furthermore, it can be confirmed from the image shown in FIG. 3C that the person 301 is not hidden by the product shelf 305.

Figure 3D:
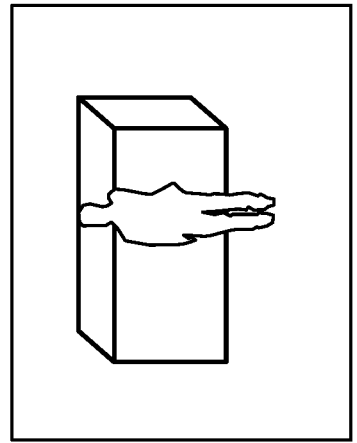
Figure 3C:
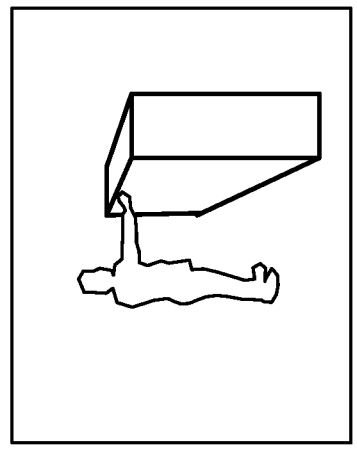
Figure 3B:
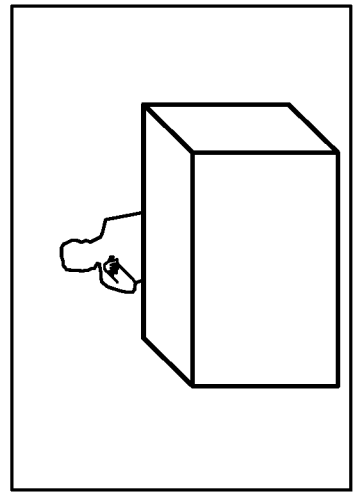

FIG. 3D shows one example of a captured image from the image capturing apparatus 304. The image in FIG. 3D is an image that has been captured from the back orientation of the person 301. It can be further confirmed from the image shown in FIG. 3D that that the person 301's right hand is hidden by the person 301. As in these examples shown by FIG. 3, in the case in which images are captured by a plurality of image capturing apparatuses in different positions, even if a captured image is of the same person at the same time, the orientation of the person whose image is captured, and whether or not any part of the person is hidden differ.

The determining unit 205 determines the person orientation for the person who is the subject of the processing (the processing subject person orientation) based on the action prediction results that have been output from the person action predicting unit 204. In addition, the determining unit 205 outputs the results (the determination results) of the processing subject person orientation that have been determined to the selecting unit 206. In the First Embodiment, there are two types of determining methods for determining the results of the processing subject person orientation, and which of the selection methods will be used can be switched in advance by the user in the settings. Below, the two types of determination methods will be explained with reference to FIG. 4

FIG. 4 is a diagram showing one example of person action prediction results in the First Embodiment. FIG. 4(A) shows one example of a table of action prediction results. FIG. 4B shows one example of a table combining the occurrence probabilities for each ideal person orientation. Note that the detection candidate actions that are shown in the table in FIG. 4A are one example, and other detection actions may also be set. In addition, for example, it may also be made such that in the case in which an action that is not a detection action candidate has been detected, the action after this detection is added to this table.

The first determination method is a method that determines the ideal person orientation for actions with a high probability of occurrence as the processing subject person orientation. Using FIG. 4A as an example, with respect to the action of checking their surroundings, which is an action with a high probability of occurrence, the frontal direction, which is the ideal person orientation, is determined as the processing subject person orientation.

The second determination method determines the ideal person orientation with a high probability of occurrence as the processing subject person orientation after having aggregated the probabilities of occurrence for each ideal person orientation, as in FIG. 4B. Specifically, using FIG. 4A as an example, first, the ideal person orientation for reaching out a hand and crouching down are the sideways orientation, and therefore, the sum of their probability of occurrence is added, and the probability of occurrence for each person orientation is aggregated as in FIG. 4B. In addition, as is shown in the example in FIG. 4B, the sideways orientation, which is the ideal person orientation with a high probability of occurrence, is determined as the processing subject person orientation. Note that when selecting the processing subject person orientations in the order of the highest probability of occurrence, one selection may be made, or a plurality of selections may also be made in the order of highest probability of occurrence.

The selecting unit 206 selects a processing subject image capturing apparatus (an optimal image capturing apparatus) for action detection for each person based on the determination results for the processing subject person orientation that was determined by the determining unit 205, and the orientation information for each person in the images that have been captured by each image capturing apparatus that have been read out from the first storage unit 211.

Specifically, the selecting unit 206 selects the image capturing apparatus that has captured an image in which the orientation of a person matches by comparing this with the determination results for the processing subject person orientation that has been determined by the determining unit 205 and the orientation information for each person in the images that that have been captured by each image capturing apparatus to serve as the processing subject image capturing apparatus. In other words, the selecting unit 206 selects the optimal image capturing apparatus from among the plurality of image capturing apparatuses based on the image capturing direction of the processing subject person according to the movement that has been predicted by the person action predicting unit 204, and the image capturing directions for the processing subject person from each of the plurality of image capturing devices. Note that during the comparison of the person orientation at this time, it may also be made such that, for example, a predetermined threshold is set as a degree of adaptability, and the image capturing apparatus that captured an image that matches an orientation of the person at or above the predetermined threshold is selected as the processing subject image capturing apparatus. The predetermined threshold can be arbitrarily set by the user. The selecting unit 206 saves the selection results to the second storage unit 212 after the selection of the processing subject image capturing apparatus.

Note that in the case in which the selecting unit 206 has still not selected even one processing subject image capturing apparatus for a person, for example, the image capturing apparatus that captured the image that was first received is selected as the processing subject image capturing apparatus. In contrast, in the case in which the processing subject image capturing apparatus has already been selected, which of the person orientation for the person in the image that has been captured by the already selected processing subject image capturing apparatus, and the person orientation in the image capturing apparatus for the received image is more ideal is determined.

In this context, in the case in which the person orientation for the person in the image that has been captured by the already selected processing subject image capturing apparatus matches the processing subject person orientation, the selecting unit 206 prioritizes the already selected processing subject image capturing apparatus. Thereby, changes to the selection results are thereby inhibited. During the action detection, which accumulates information for a plurality of frames, it is possible to inhibit information accumulation from being redone by inhibiting changes to the selection results for the processing subject image capturing apparatus.

In addition, the selecting unit 206 does not redo the selection of the processing subject image capturing apparatus until a predetermined period of time has elapsed from this selection. Thereby, even if, for example, the person orientation in one frame of the already selected processing subject image capturing apparatus has been wrongly determined, it is possible to exclude the effects of this incorrect determination. The predetermined time for redoing this selection can be suitably set by a user, and for example, can be set to an arbitrary time, such as 1 second, several seconds, or the like.

The person posture estimating unit 207 detects the position in the image of the key points of a person by using machine learning or the like from a full-body image of a person being tracked based on the tracking results that have been output from the human detection tracking unit 202 and the images that have been captured by the plurality of image capturing apparatuses. After this, the detected coordinates and likelihood are output as the posture estimation results. The person posture estimating unit 207 transmits the posture estimation results to the person orientation estimating unit 208 after this processing is completed.

FIG. 5 is a diagram showing one example of posture estimation results in the First Embodiment. The posture estimation results include, for example, as is shown in FIG. 5, the tracking ID, the coordinates for each key point, and the degree of likelihood. Furthermore, a human body detection likelihood that is calculated based on the detection likelihood for each key point is included. In this context, a key point shows the main organ points and joints of a person, and includes, for example, both eyes, both ears, the nose, both shoulders, both hips, both elbows, both wrists, both knees, both ankles, and the like.

The person orientation estimating unit 208 estimates a person's orientation based on the posture estimation results that have been transmitted from the person posture estimating unit 207, and saves the estimation results to the first storage unit 211. The estimated person orientation is one or more of the orientation of their face, the orientation of their body, the orientation of their hand, or the like. In this context, the ideal person orientation for action detection will be explained referring to FIG. 6.

FIG. 6 is a diagram showing one example of an action of a person reaching out their hand and a similar action. FIG. 6A and FIG. 6B are diagrams showing person images with frontal orientations. Note that in the examples that are shown in FIG. 6A, and FIG. 6B, the person is wearing a mask. Furthermore, FIG. 6A is an image of when they are reaching out their hand, and FIG. 6B is an image of when they are fixing their mask with their hand. FIG. 6C shows an image of the results of the posture estimation shown in FIG. 6A. In FIG. 6C, the positions of each of the estimated key points are shown with circles, and in addition, adjacent key points are shown as being connected with lines. In the same manner, FIG. 6D shows an image for the results for pose estimation for FIG. 6B. FIG. 6D also shows the position of each of the estimated key points with a circle, and in addition shows the adjacent key points as being connected with lines in the same manner as FIG. 6C and the like.

Figures 6A, 6B, 6E, 6F:
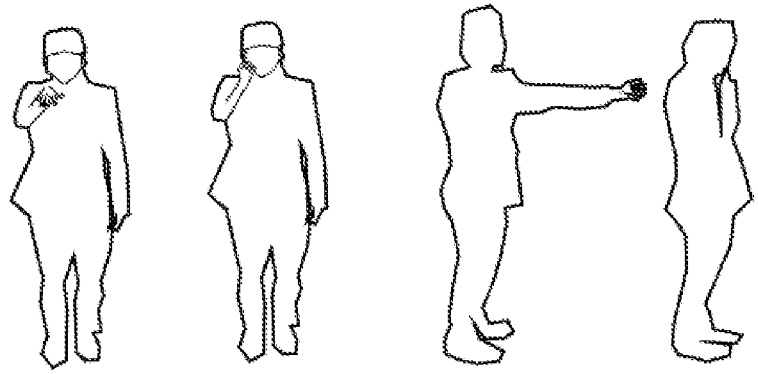
FIG. 6A to FIG. 6M are images of a hand reaching out and similar actions in an embodiment.

When comparing FIG. 6A, and FIG. 6B, the position and orientation of the fingers are different, and therefore, it is possible to differentiate if they are reaching their hand out, or if they are not reaching their hand out, but are pointing their hand towards their face. However, upon comparing FIG. 6C and FIG. 6D, there is no difference in size for the key points for the posture estimation results, and the therefore, it is difficult to distinguish if they are reaching their hand out.

Figures 6C, 6D, 6G, 6H:
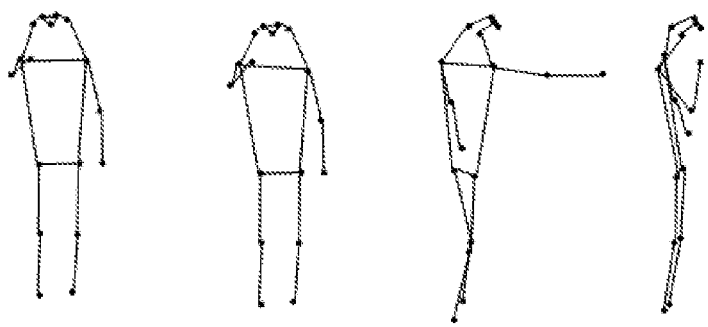

FIG. 6E and FIG. 6F are diagrams showing one example of person images with sideways orientations. FIG. 6E is an image from when they are reaching their hand out, and FIG. 6F is an image from when they are fixing their mask with their hand. FIG. 6G shows the results of the posture estimation for FIG. 6E as an image. In the same manner as in FIG. 6C and the like, in FIG. 6G as well, the positions of each of the estimated key points are shown using circles, and in addition, adjacent key points are shown as being connected by lines. In the same manner, FIG. 6H shows the results of the posture estimation for FIG. 6F as an image. In the same manner as in FIG. 6C and the like, in FIG. 6H as well, the positions of each of the estimated key points are shown using circles, and in addition, adjacent key points are shown as being connected by lines.

Upon comparing the images of FIG. 6E and FIG. 6F, it is possible to distinguish if the person is reaching their hand out, or if they are not reaching their hand out but are pointing their hand toward their face based on the differences in the positions and orientations of their fingers. Furthermore, upon comparing FIG. 6G, and FIG. 6H, it is easy to distinguish whether or not they are reaching their hand out, because within the key points of the posture estimation results, there are large differences in the coordinates for one wrist of one hand, elbow, and shoulder.

Figures 6I, 6J:
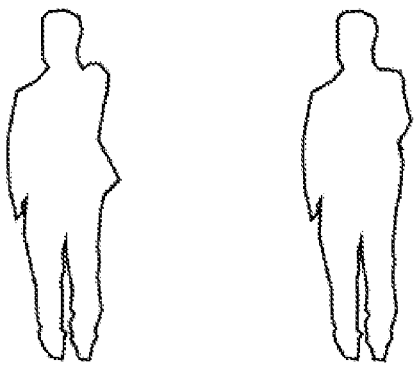
Figures 6K, 6L, 6M:
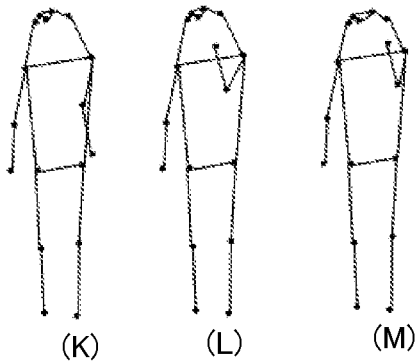

FIG. 6I and FIG. 6J are diagrams showing one example of a person image with a back orientation. FIG. 6I is an image showing when they reached their hand out, and FIG. 6J is an image showing when they fixed their mask with their hand. FIG. 6K and FIG. 6L show the results for the posture estimation in FIG. 6I as images. In FIG. 6K and FIG. 6L as well, in the same manner as in FIG. 6C and the like, the positions of each of the estimated key points are shown using circles, and in addition, adjacent key points are shown as being connected by lines. Similarly, FIG. 6M shows the results of the posture estimation in FIG. 6J as an image. In FIG. 6M as well, in the same manner as in FIG. 6C and the like, the positions of each of the estimated key points are shown using circles, and in addition, adjacent key points are shown as being connected by lines.

As is shown in FIG. 6I and FIG. 6J, in the back orientation, the movements of the person's hands are hidden by the person's body, and in FIG. 6K, even though the person is reaching their hand out, there is a mistaken detection in which the key point for the right hand is as though the hand is lowered down. In addition, upon comparing FIG. 6L and FIG. 6M, there is no large difference between the key points from the posture estimation results, and therefore, it is difficult to distinguish whether or not they are reaching their hand out.

In the same manner as in this example, it is easier to detect a hand reaching out in the sideways orientation than it is in the front orientation or the back orientation. Note that in this example, the action of fixing a mask with a hand is given as an example of a similar action in comparison to reaching out a hand. However, other similar actions such as a person touching their face with their hand or adjusting their glasses with their hand, and the like, are also the same. In addition, although reaching out their hand has been given as example in this context, in actions other than reaching out their hand, such as the action of turning their face to the side and checking their surroundings, sitting down, and the like, there are also person orientations in which it is easy to distinguish similar actions and key points.

The detecting unit 209 performs action detections for all of the people being tracked based on the tracking results, the posture estimation results, and the person orientation, and outputs the action detection results. After this, along with transmitting these action detection results to the transmitting unit 210, they are saved on the third storage unit 213.

After receiving the action detection results that have been detected by the detecting unit 209, the transmitting unit 210 transmits these action detection results to a transmission destination that has been registered in advance.

The first storage unit 211 (a person orientation storage unit) stores the estimation results that have been transmitted from the person posture estimating unit 207. The second storage unit 212 (processing subject image capturing apparatus storage unit) stores the selection results that have been selected by the selecting unit 206. The third store unit 213 (action detection results storage unit) stores the action detection results that have been detected by the detecting unit 209. Note that as described above, although the image processing apparatus 200 of the First Embodiment may have 3 storage units, the first storage unit 211, the second storage unit 212, and the third storage unit 213 may also be made one storage unit.

Figure 7:
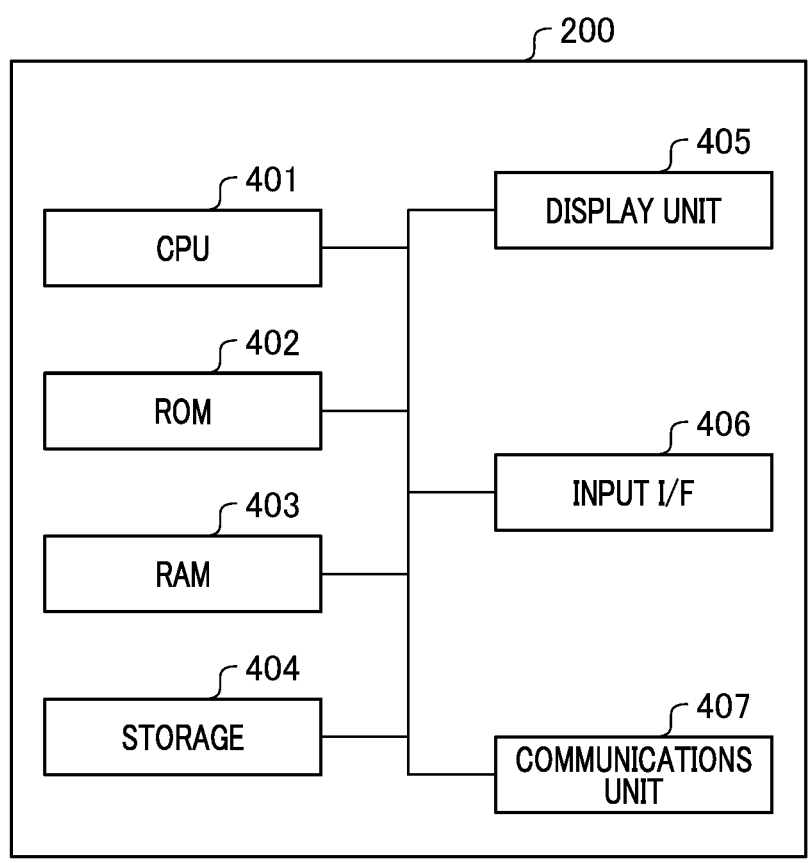
FIG. 7 is a diagram showing a hardware configuration for an image processing apparatus in an embodiment.

Next, the hardware configuration of the image processing apparatus 200 will be explained below in reference to FIG. 7. FIG. 7 is a diagram showing a hardware configuration of the image processing apparatus 200 in the First Embodiment.

The image processing apparatus 200 has a CPU 401, a ROM 402, a RAM 403, a storage 404, a display unit 405, an input OF 406, and a communications unit 407.

The CPU 401 is configured by at least one computer, and is a central processing unit that executes each type of processing by reading out a control program that has been stored on the Read-Only Memory (ROM) 402. The Random Access memory (RAM) 403 is used as the main memory of the CPU 401, and a temporary storage region such as a work area or the like. The storage 404 stores each type of data, each type of program, and the like. The display unit 405 is a monitor, a display, or the like and displays each type of information on a screen. Note that the display unit 405 may also be a display apparatus that is combined with a touch panel. The input I/F 406 is an interface for inputting operation information, and is, for example, a keyboard, a touch panel, or the like. The communications unit 407 performs communication processing with an external apparatus such as the image capturing apparatus 100 or the like wired or wirelessly via a network.

The functions and processing of the image processing apparatus 200 are realized by the CPU 401 reading out a program that is stored on the ROM 402 or the storage 404, and then executing this program. In addition, as another example, instead of the ROM 402 and the like, the CPU 401 may also read out a program that is stored on a storage medium such as an SD card or the like.

Note that in the First Embodiment, it is assumed that in the image processing apparatus 200, one processor (the CPU 401) executes each functional unit and each process shown in the following flowcharts for the image processing apparatus 200 by using at least one memory (the ROM 402). However, this may also be a different mode. For example, it is also possible to execute each functional unit and each type of processing shown in the following flowcharts in the image processing apparatus 200 by having a plurality of processors, and a plurality of RAMs, ROMs, and storages cooperate. In addition, a portion of the processing may also be executed by using a hardware circuit. In addition, it may also be made such that the functions and processing of the image processing apparatus 200 that are described below are realized using a processor other than a CPU (for example, instead of a CPU, a Graphic Processing Unit (GPU) may also be used)

Figure 8:
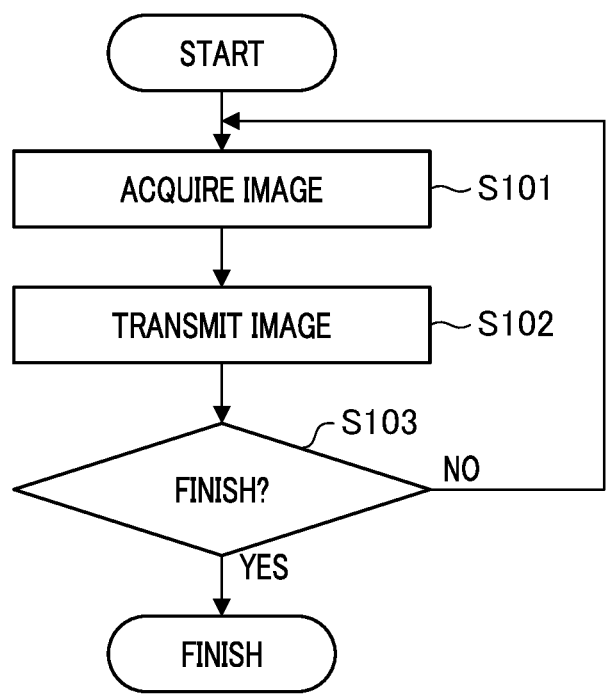
FIG. 8 is a flowchart showing operations of an image capturing apparatus in an embodiment.

Next, the processing for the image capturing apparatus 100 in the First Embodiment will be explained below in reference to FIG. 8. FIG. 8 is a flowchart showing the operations (processing) of the image capturing apparatus 100 in the First Embodiment.

First, during S101, the image capturing unit 101 of the image capturing apparatus 100 acquires images by capturing images of the subject region. The images that are acquired at this time are transmitted to the image transmitting unit 102 at predetermined time intervals. Next, during S102, the image transmitting unit 102 transmits the images that have been transmitted from the image capturing unit to the image processing apparatus 200. Next, in S103, the CPU 401 determines whether or not there is a request to stop image transmission. In the case in which the determination result is that there is no request to stop image transmission, the processing returns to S101, and the same processing is repeated. In contrast, in the case in which there has been a request to stop image transmission, the processing is completed.

Figure 9:
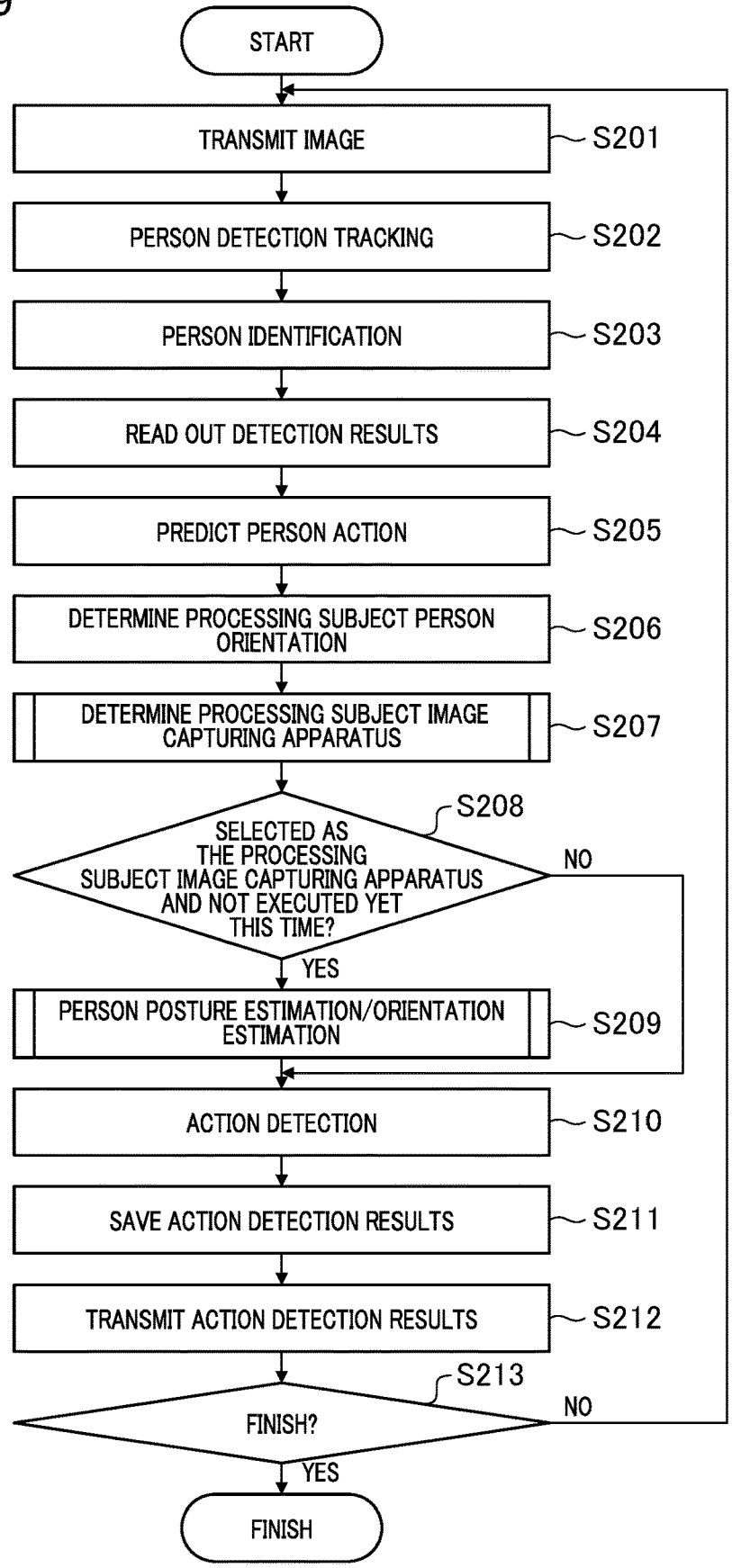
FIG. 9 is a flowchart showing operations of an image processing apparatus of an embodiment.

Note that although the processing shown in FIG. 9 is the processing for the image capturing apparatus 100, the processing for the image capturing apparatus 110 is the same as that for the image capturing apparatus 100. Furthermore, at this time, although it is not illustrated, it is assumed that the image capturing apparatus 110 is performing the same processing in parallel to the processing in the image capturing apparatus 100, or in joint operation with the processing in the image capturing apparatus 100.

Next, the processing for the image processing apparatus 200 in the First Embodiment will be explained below with reference to FIG. 9. FIG. 9 is a flowchart showing the operations (processing) of the image processing apparatus 200 in the First Embodiment.

First, during S201, the image receiving unit 201 receives each of the images that have been transmitted from the image capturing apparatus 100 and the image capturing apparatus 110. Note that in the following explanation, the image capturing apparatus that captured the image that has been received by the image receiving unit 201 is referred to as a determination subject image capturing apparatus. That is, in the First Embodiment, the image capturing apparatus 100 and the image capturing apparatus 110 are the determination subject image capturing apparatuses.

Next, during S202, the tracking unit 202 performs person detection processing and tracking processing for each person in the images that have been acquired in S101, and calculates the tracking results (tracking information) for each of these people. After this, the tracking unit 202 transmits the calculated tracking results to the person identifying unit 203.

Next, during S203, the person identifying unit 203 extracts (calculates) the person feature amounts from the images that have been acquired by the image capturing apparatus 100, and the feature amounts for the people from the images that have been acquired by the image capturing apparatus 110. After this, the person identifying unit 203 compares the feature amounts for the images that have been captured by the image capturing apparatus 100 and the feature amounts for the images that have been captured by the image capturing apparatus 110, and in the case in which their degree of similarity is at or above a predetermined threshold, performs person identifying processing that determines whether someone is the same person.

Next, in S204, the person action predicting unit 204 reads out past action detection results from the third storage unit 213. Next, during S205, the person action predicting unit 204 predicts the actions of the people who have been detected in S202 based on the past action detection results that have been read out during S204, and after calculating action prediction results, outputs these to the determining unit 205.

Next, during S206, the determining unit 205 determines the processing subject person orientation for each person that has been detected during S202 based on the action prediction results that have been output from the person action predicting unit 204 during S205. After this, the determining unit 205 outputs the determination results that have been determined (the processing subject person orientation) to the selecting unit 206.

Next, during S207, the selecting unit 206 determines the processing subject image capturing apparatus (the optimal image capturing apparatus) for each person from the processing subject person orientation that has been output from the determining unit 205 during S206, and the orientation information for each person that has been detected in the images that have been captured by each of the image capturing apparatuses. In this context, the processing for determining the processing subject image capturing apparatus for each person during S207 will be described in detail with reference to FIG. 10. FIG. is a flowchart showing the determination processing for the processing subject image capturing apparatus for a processing subject person in S207.

Figure 10:
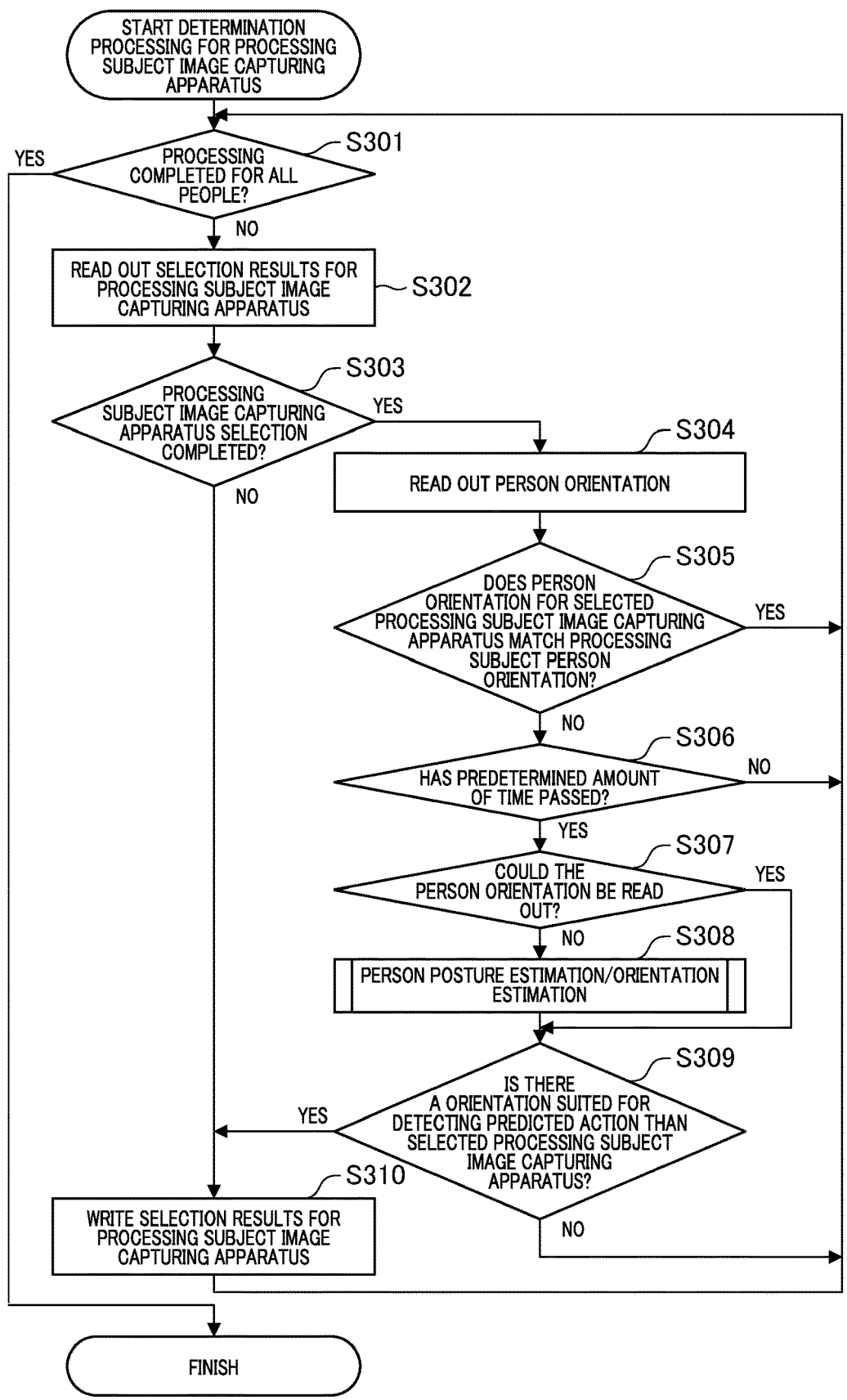
FIG. 10 is a flowchart showing operations of an image processing apparatus of an embodiment.

First, during S301, the CPU 401 determines whether or not the selection processing for the processing subject image capturing apparatus for all of the people who are made processing subjects is complete. In the case in which the determination results are that a processing subject image capturing apparatus has been selected for all of the people, the processing for determining the processing subject image capturing apparatus for each person that is shown in FIG. 10 is completed, and the processing proceeds to S208. In contrast, in the case in which a processing subject image capturing apparatus has not been selected for all persons, the processing proceeds to S302.

Next, during S302, the selecting unit 206 reads out the past selection results for the processing subject image capturing apparatuses from the second storage unit 212. Next, during S303, the selecting unit 206 determines whether or not the selection of the processing subject image capturing apparatuses for a predetermined person that is being processed (the processing subject) has been completed. If the determination result is that this has not yet been selected, the processing proceeds to S310. In contrast, in the case in which it has been selected, the process proceeds to S304. Next, during S304, the selecting unit 206 reads out the person orientation information from the first storage unit 211.

Next, during S305, the selecting unit 206 determines whether or not the person orientation for the processing subject image capturing apparatus that has been selected matches the processing subject person orientation. In the case in which the determination results are that the person orientation for the processing subject image capturing apparatus that has been selected and the processing subject person orientation match, the processing returns to S301, and the same processing is repeated. In contrast, in the case in which the person orientation for the processing subject image capturing apparatus that has been selected, and the processing subject person orientation do not match, the processing proceeds to S306. Note that, when the above-described determination is being made, it may also be made such that for example, a predetermined threshold may be set to serve as the degree of suitability, and whether or not the person orientations match is determined based on this predetermined threshold.

Next, during S306, the selecting unit 206 determines whether or not a predetermined amount of time has passed after the selection of the processing subject image capturing apparatus. In the case in which the results of this determination is that a predetermined amount of time has passed, the processing proceeds to S307. In contrast, if the predetermined period of time has not passed, the processing proceeds to S301.

Next, during S307, the selecting unit 206 determines whether or not the person orientation for the determination subject image capturing apparatus has been read out during S304. In the case in which the results of this determination are that the person orientation for the determination subject image capturing apparatus has been read out, the process proceeds to S309. In contrast, in the case in which the person orientation for determination subject image capturing apparatus has not been read out, the processing proceeds to S308.

Figure 11:
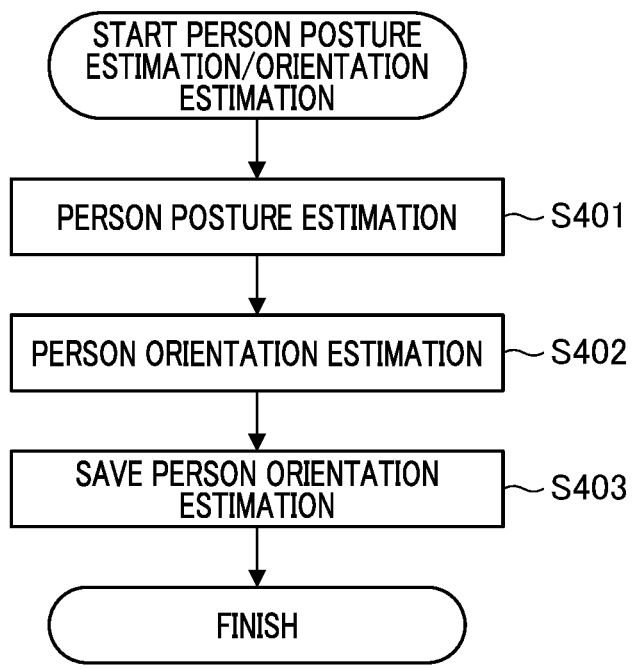
FIG. 11 is a flowchart showing the operations of an image processing apparatus of an embodiment.

Next, during S308, the person posture estimating unit 207 performs person posture estimation processing and person orientation estimation processing. In this context, the processing for the person posture estimation and the person orientation estimation during S308 will be explained in detail below with reference to FIG. 11. FIG. 11 explains the processing for the posture estimation and the person orientation estimation from S308 by using a flowchart.

First, during S401, the person posture estimating unit 207 detects the position on the screen of the key points for a person by using machine learning and the like from a full body image of a predetermined person who is being processed, and outputs the detected coordinates and likelihood to serve as posture estimation results. After this, the person posture estimating unit 207 transmits these posture estimation results to the person orientation estimating unit 208.

Next, during S402, the person orientation estimating unit 208 estimates the person orientation based on the posture estimation results that have been transmitted from the person posture estimating unit 207. Next, during S403, the person orientation estimating unit 208 saves the information for the estimated person orientation to the first storage unit 211.

Returning to FIG. 10, next, during S309, the selecting unit 206 determines whether or not the person orientation for the determination image capturing apparatus is more suited to the detection of the predicted movement than the person orientation of the processing subject image capturing apparatus that has already been selected. In the case in which the result of this determination is that the person orientation for the determination subject image capturing apparatus is more suited thereto, the processing proceeds to S310. In contrast, in the case in which it has been determined that the person orientation for the determination subject image capturing apparatus is not more suited to this, the processing returns to S301, and the same processing is repeated.

At the time that this determination is being made, in the case in which only the person orientation of the determination subject image capturing apparatus matches the processing subject person orientation, it is determined that the person orientation for the determination subject image capturing apparatus is more suitable. In all other cases, that is, in the case in which the person orientation for the determination subject image capturing apparatus does not match the processing subject person orientation, a determination is performed to prioritize the processing subject image capturing apparatus that has already been selected. It is thereby possible to suppress the number of times that the selection results are changed. Note that when the above-described determination is being made, it may also be made such that, for example, a predetermined threshold may be set to serve as the degree of suitability, and determination as to whether or not the determination subject image capturing apparatus is suitable for the detection of this predicted action is made based on this predetermined threshold.

Next, during S310, the selecting unit 206 selects the determination subject image capturing apparatus to serve as the processing subject image capturing apparatus for the person who is being processed, and saves the selection results to the second storage unit 212. After these selection results have been stored, the processing returns to S301, and the same processing is repeated.

Returning to FIG. 9, next, during S208, the person posture estimating unit 207 determines whether or not the determination subject image capturing apparatus has been selected as the processing subject image capturing apparatus and posture estimation has been executed on the received image. As a result of this determination, in the case in which the processing subject image capturing apparatus is selected, and posture estimation has not been executed on the received image, the processing proceeds to S209. In contrast, in the case in which the determination subject image capturing apparatus is selected as the processing subject image capturing apparatus, and posture estimation has already been executed on the received image, the processing proceeds to S210.

Next, during S209, the same processing as the processing for the above-described S380 is performed, and an explanation thereof is therefore omitted. Next, during S210, the detecting unit 209 performs action detection for all of the people being tracked based on the tracking results, posture estimation results, and person orientations, and outputs the action detection results. Note that the detecting unit 209 performs action detection for all of the people being tracked based on the tracking results that were calculated in S202, the posture estimation results that were calculated in S401 or S209, and the person orientations that were calculated during S402 or S209, and outputs the action detection results.

Next, during S211, the detecting unit 209 transmits the action prediction results to the transmitting unit 210, and saves the action prediction results to the third storage unit 213. Next, during S212, the transmitting unit 210 transmits the action detection results to a predetermined transmission destination that has been set in advance.

Next, during S213, the CPU 401 determines whether or not there is a request to stop image transmission. In the case in which the result of this detection is that there is no request to stop the image transmission, the processing returns to S201, and the same processing is repeated. In contrast, in the case in which there has been a request to stop image transmission, the processing is completed.

As was described above, in the image processing system that is configured by the plurality of image capturing apparatuses and the image processing apparatus 200 in the First Embodiment, the next actions of people in images that have been captured by the image capturing apparatuses are predicted, and posture estimation processing is performed on images with person orientations for which these actions are easily detected. It is thereby possible to reduce the processing load in comparison to cases in which posture estimation and action detection are performed based on video images of all of the people from all of the image capturing apparatuses that are disposed.

In the Second Embodiment, changes to the number of simultaneous posture estimations according to the selection of the processing subject image capturing apparatus taking into consideration processing to switch an action prediction based on a behavior that can become the beginning of an action and a person being hidden, as well as the usage state of the calculation resources, will be explained. Below, the explanation will focus on the portions that are different in comparison to the First Embodiment.

Figure 12:
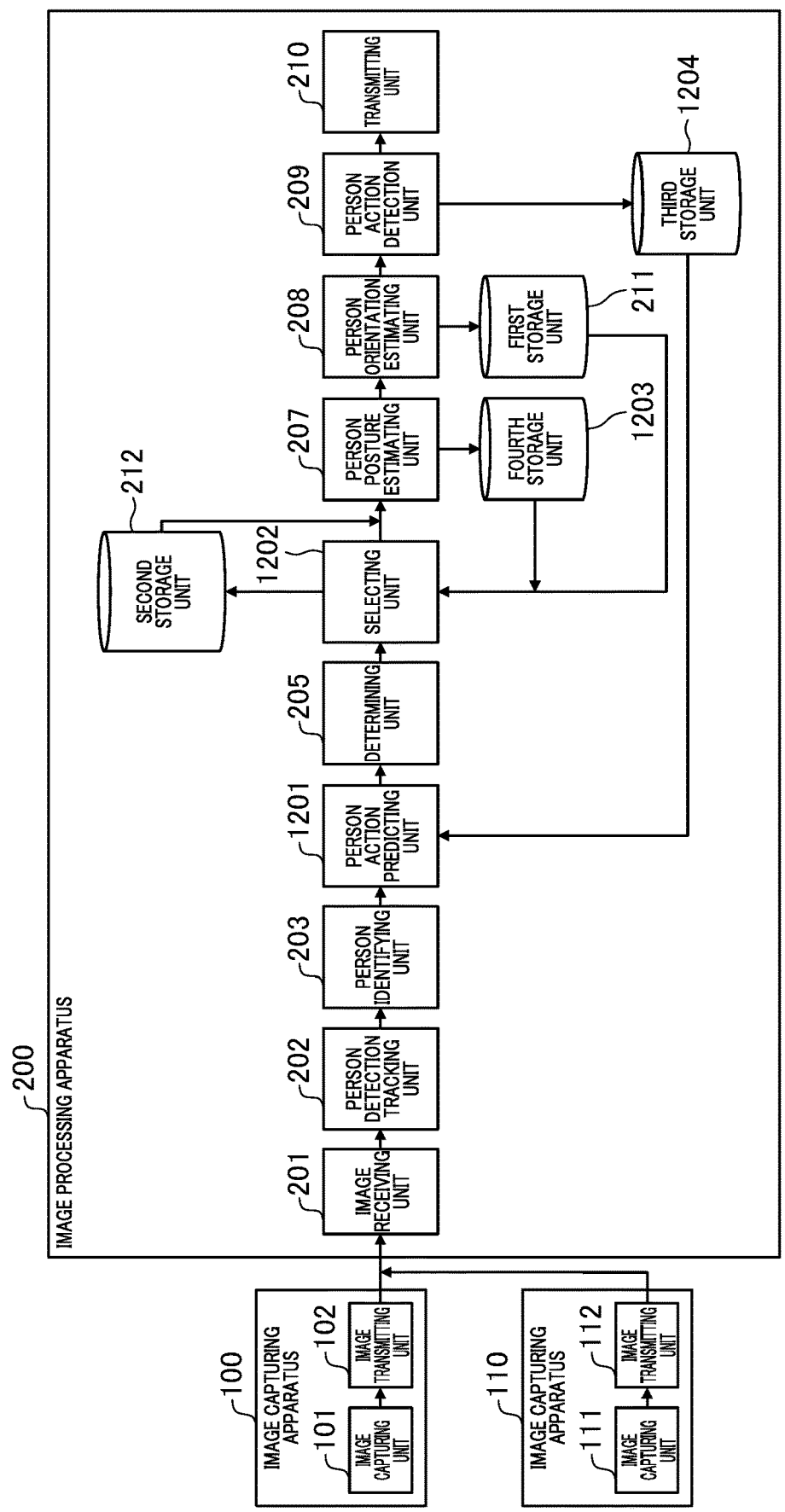
FIG. 12 is a block diagram for the configuration of an image processing system in an embodiment.

FIG. 12 is a diagram showing a configuration of an image processing system in the Second Embodiment. Note that explanations of the configurations and functional units of the image processing system of the Second Embodiment that are the same as those of the image processing system of the First Embodiment will be omitted.

A third storage unit 1204 is the same configuration as the third storage unit 213 in the First Embodiment, and stores the detection processing results for the detecting unit 209. These detection processing results are not just a history of the actions that have been detected, but also include the occurrence of behaviors that could have been the start of an action. For example, the behavior of a wrist being raised is an example of a behavior that could be the start of the action of reaching out a hand. Note that as was explained in FIG. 6, it is difficult to distinguish reaching out a hand from similar actions from the front even if posture estimation is performed. However, it is possible to determine whether or not a wrist is being raised even in the case in which this is viewed from the front. Although even if someone raises their wrist, it does not necessarily mean that they will reach out their hand, it is possible to determine that this could be the start of reaching out their hand or a similar action.

A person action predicting unit 1201 is the same configuration as the person action predicting unit 204 from the First Embodiment, and reads out the past action detection results from the third storage unit 1204, then determines if a behavior that could be the start of an action is occurring. In the case that the result of this determination is that a behavior that could be the start of an action has occurred, processing is performed to raise the probability of occurrence for this action in the prediction.

For example, in the case in which the behavior of raising a wrist has been confirmed, processing is performed that raises the probability of occurrence for reaching out a hand. Although the added percentage may be arbitrarily set, in this case, for example, 20% is added. In addition, in the case in which the detecting unit 209 detects an action that is different from the action that has been predicted by the person action predicting unit 1201, the person action predicting unit 1201 performs processing to increase the probability of occurrence for the detected action that is different than this prediction. It is thereby possible to confirm behaviors that may become the start of an action and change predictions even in the case in which past predictions were incorrect.

A fourth storage unit 1203 stores the posture estimation results from the posture estimating unit 207. The posture estimation results include human body detection likelihood in the same manner as FIG. 5. The human body detection likelihood becomes low in the case in which a human body is hidden by some kind of obstacle such as their own body, another person, a shelf, or the like.

A selecting unit 1202 is the same configuration as the selecting unit 206 in the First Embodiment, and reads out the posture estimation results from the fourth storage unit 1203. When selecting the processing subject image capturing apparatus for each person, the selecting unit 1202 selects the image capturing apparatus that has captured the image in which the least amount of the person is hidden to serve as the processing subject image capturing apparatus in the case in which there is a plurality of processing subject image capturing apparatuses for the processing subject person orientation (the case in which a plurality have been selected). Specifically, the image capturing apparatus that captured an image in which the human body detection likelihood for the posture estimation results by the person posture estimating unit 207 is the highest is selected to serve as the processing subject image capturing apparatus. It is thereby possible to select the image capturing apparatus that is least affected by hidden body parts or the like from among the image capturing apparatuses with person orientations that are suitable for the detection of the predicted action. Note that when the selecting unit 1202 selects a processing subject image capturing apparatus for a processing subject person orientation, it may also be made so as to select the processing subject image capturing apparatus by setting a predetermined threshold to serve as the degree of suitability in the same manner as in the First Embodiment.

In addition, the selecting unit 1202 acquires the calculation resource usage state for the image processing apparatus 200. For example, the CPU usage percentage, the RAM usage percentage, or the application programming interface (API) for use in acquiring the GPU usage percentage that are provided by an Operating System (OS) are used when acquiring the calculation resource usage state. If the calculation resources have a specific level of availability or above based on the acquired calculation resource usage state, it may also be made such that a plurality of processing subject image capturing apparatuses are selected for each person being tracked (for every person who is being tracked). It is thereby possible to perform posture estimation for each person from even more person orientations, and therefore, the accuracy of the action detection is increased.

Figure 13:
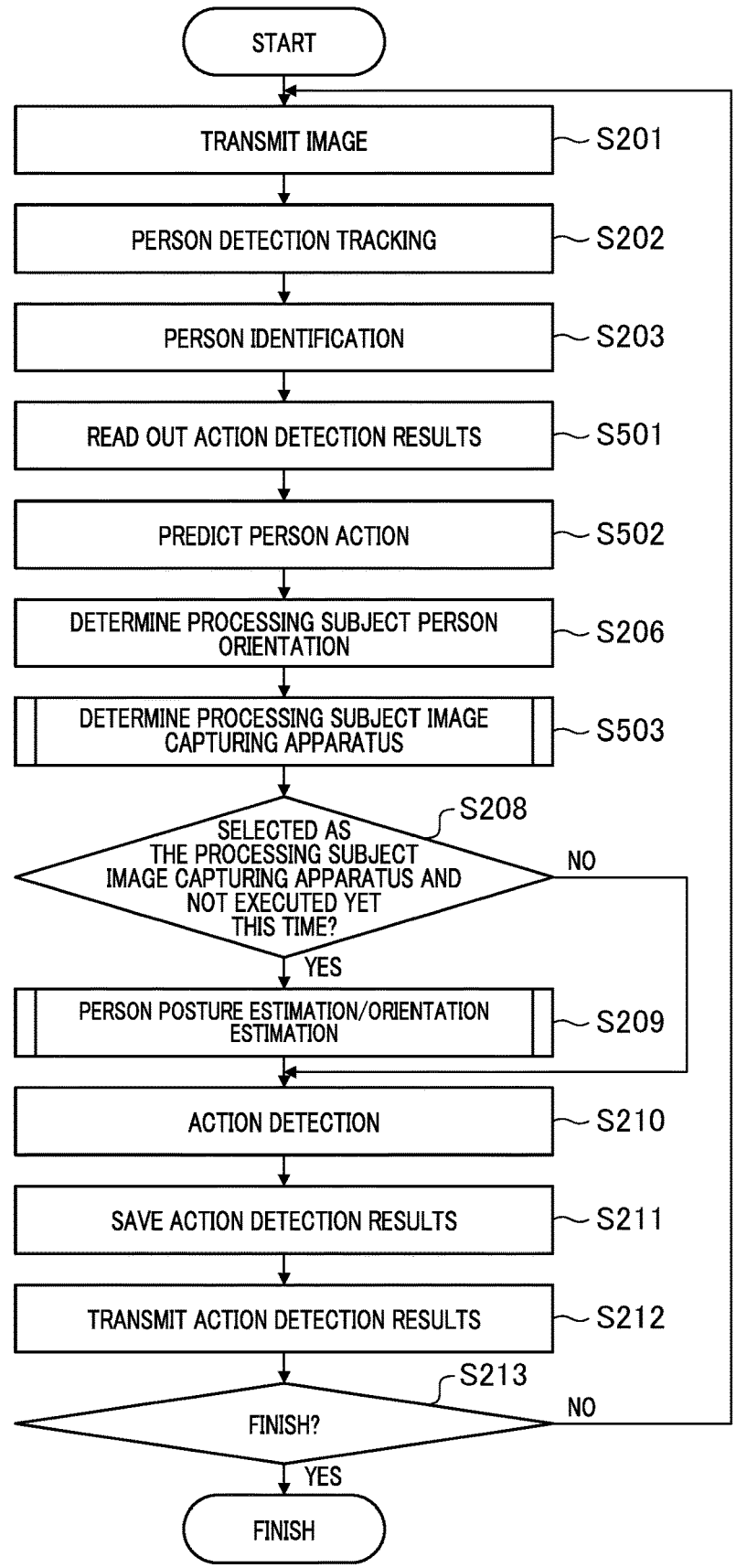
FIG. 13 is a flowchart showing the operations of an image processing apparatus of an embodiment.

FIG. 13 is a flowchart showing the operations (processing) of the image processing apparatus 200 in the Second Embodiment. Note that in FIG. 13, the processing that is the same as that in FIG. 9 will be given the same step numbers, and explanations thereof will be omitted.

During S501, the person action predicting unit 1201 acquires the action detection results from the third storage unit 1204. During S502, the person action predicting unit 1201 predicts the actions of the person based on whether a behavior that is the start of a predetermined action is included in the acquired action detection results.

Figure 14:
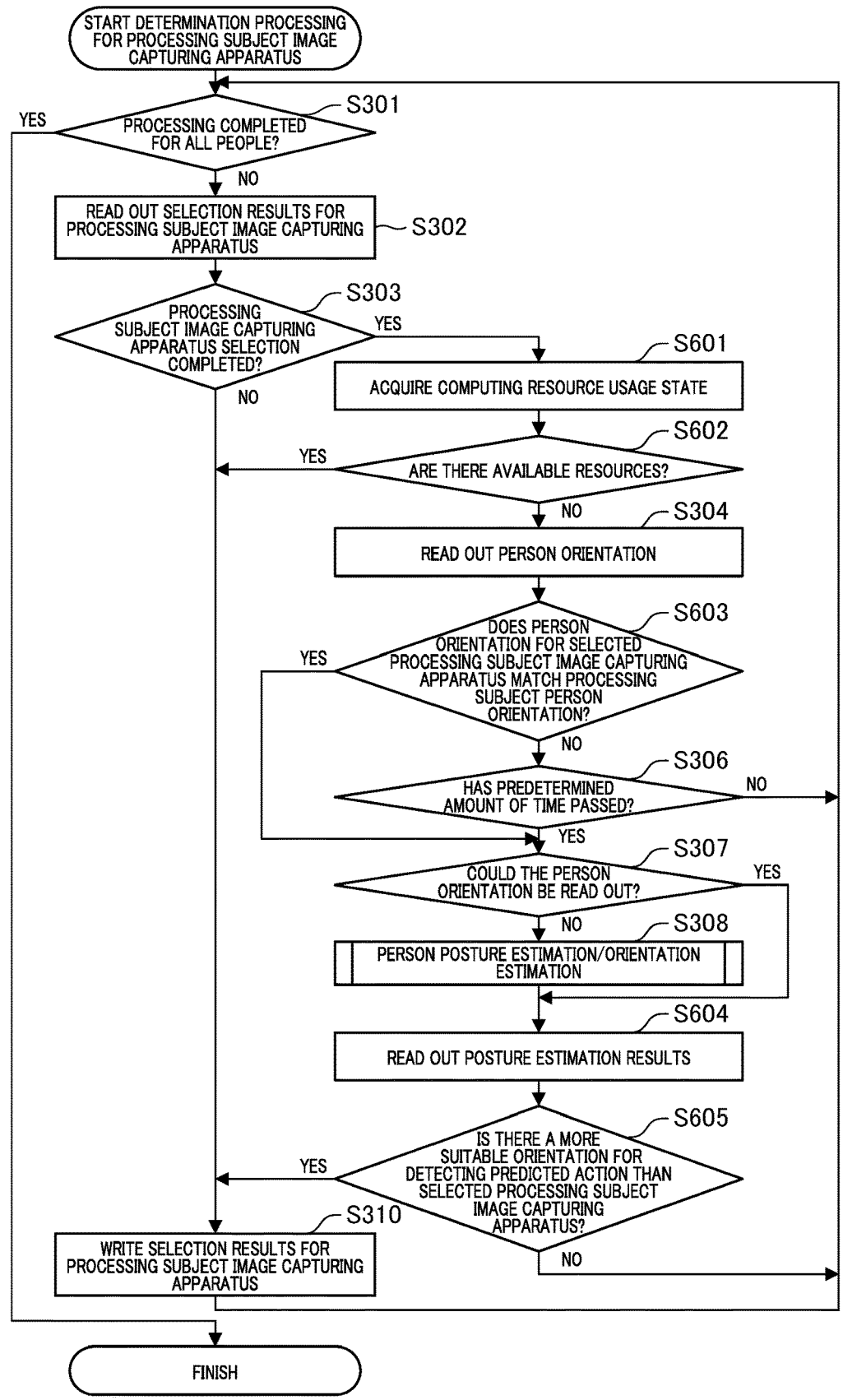
FIG. 14 is a flowchart showing the operations of an image processing apparatus of an embodiment.

During S503, the selecting unit 206 determines the processing subject image capturing apparatuses for each person. In this context, the processing for determining the processing subject image capturing apparatuses in S503 will be explained using the flowchart in FIG. 14. FIG. 14 is a flowchart showing the determination processing for the processing subject image capturing apparatus for a processing subject person in S503. Note that in FIG. 14, the processing that is the same as that in FIG. 10 will be given the same step numbers, and explanations thereof will be omitted.

During S601, the selecting unit 1202 uses the API for the OS and acquires the calculation resource usage state. During S602, the selecting unit 1202 determines whether or not there are resources that are available to an extent that a plurality of processing subject image capturing apparatuses can be selected for predetermined people who are being processed from the acquired calculation resources. In the case in which the result of this determination is that there are available resources, the processing proceeds to S310. In contrast, in the case in which there are no available resources, the processing proceeds to S304.

During S603, the selecting unit 1202 determines whether or not the person orientation for the processing subject image capturing apparatus that has been selected matches the person orientation for the processing subject person. In the case in which, as the result of this determination, the person orientation for the processing subject image capturing apparatus that has been selected matches the person orientation for the processing subject person, the processing proceeds to S306. In contrast, in the case in which the person orientation for the processing subject image capturing apparatus that has been selected does not match the processing subject person orientation, the processing proceeds to S307. During S604, the selecting unit 1202 reads out the posture estimation results from the fourth storage unit 1203.

During S605, the selecting unit 1202 determines whether or not the person orientation for the determination subject image capturing apparatus is more suitable for the detection of the predicted action than the person orientation for the processing subject image capturing apparatus that has already been selected. In the case in which, as the result of this determination, it has been determined the person orientation for the determination processing subject image capturing apparatus is more suitable, the processing proceeds to S310. In contrast, in the case in which the person orientation for the processing subject image capturing apparatus that has been selected is not suitable, the processing returns to S301, and the same processing is repeated.

Note that in S605, in the case in which only the person orientation for the determination subject image capturing apparatus matches the processing subject person orientation, the selecting unit 1202 determines that the person orientation for the determination subject image capturing apparatus is more suitable. In addition, cases are assumed in which the person orientations for both the determination subject image capturing apparatus and the processing subject image capturing apparatus that has already been selected match the processing subject person orientation. In such cases, in the case in which the human body detection likelihood from the posture estimation results is at or higher by a predetermined amount for the results for the determination subject image capturing apparatus, the selecting unit 1202 determines that the person orientation for the determination subject image capturing apparatus is more suitable. It is possible to suppress the number of times that the selection results are changed by prioritizing the processing subject image capturing apparatus that has already been selected in all other cases.

Therefore, the image processing system in the Second Embodiment is able to select the image capturing apparatus that is the least effect by hidden body parts or the like to serve as the processing subject image capturing apparatus from among the image capturing apparatuses for which the person orientation is suitable for detecting the predicted action. In addition, posture estimation can be performed based on a larger number of person orientations for each person according to the available capacity of the computing resources, thereby making it possible to improve the accuracy of the action detection.

In the Third Embodiment, action predictions according to person position, a setting screen for the ideal person orientation for each action, and a results confirmation screen will be explained. Below, the explanation will be given focusing on the parts of the Third Embodiment that are different in comparison to those of the First Embodiment and the Second Embodiment.

Figure 15:
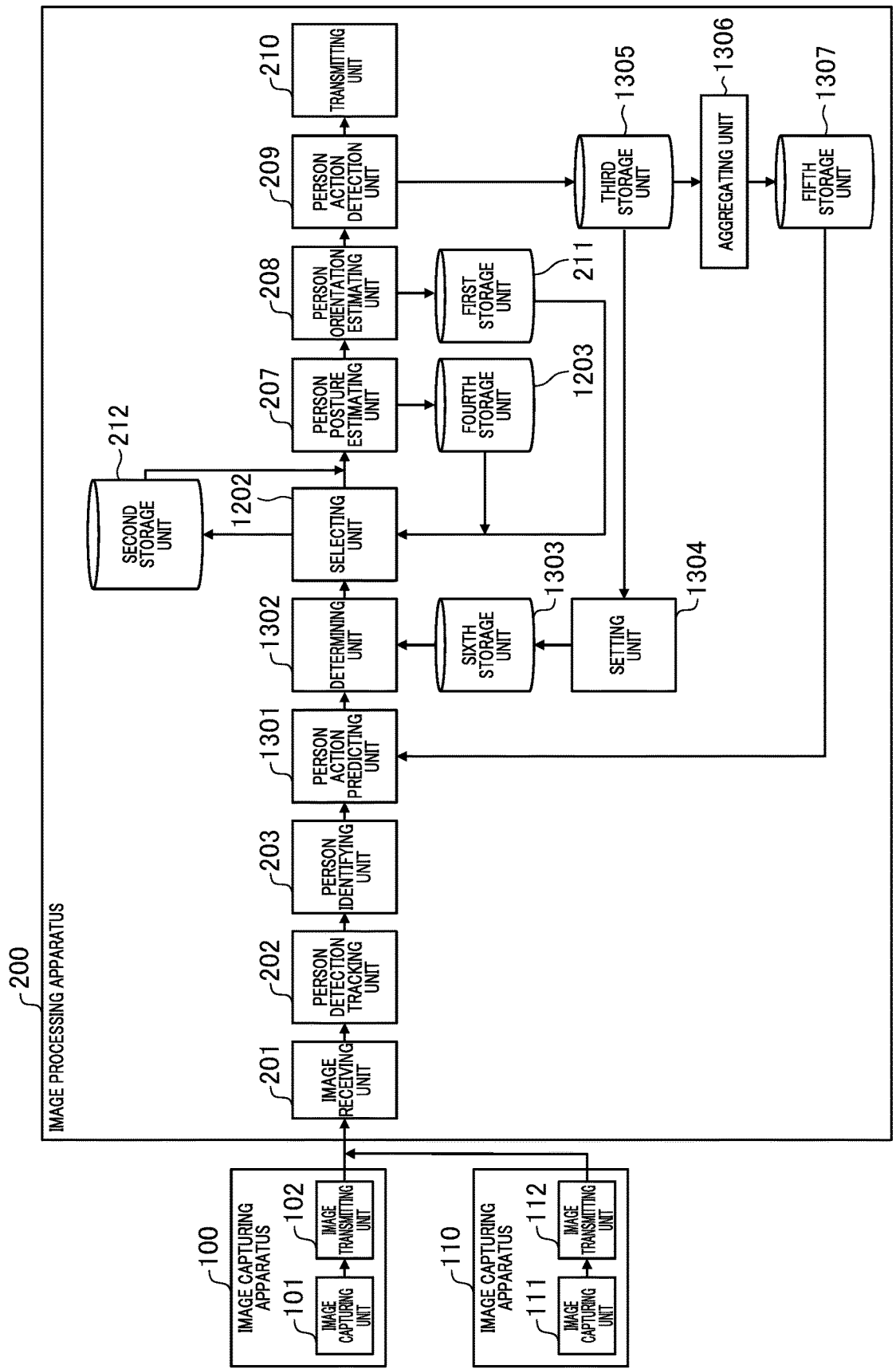
FIG. 15 is a diagram showing one example of a person action prediction based on a person position in an embodiment.

FIG. 15 is a diagram showing a configuration of the image processing system of the Third Embodiment. Note that in the configuration of image processing system in the Third Embodiment, explanations of the configurations and functional units that are the same as those in the First Embodiment and the Second Embodiment will be omitted.

A fifth storage unit 1307 stores past aggregation results. An aggregating unit 1306 reads out the action detection results from a third storage unit 1305, and after this, reads out the past aggregation results from the fifth storage unit 1307, and aggregates these action detection results together with these past aggregation results. In addition, it may also be made such that the aggregating unit 1306 reads out the action detection results after having previously read out the past aggregation results, and aggregates these together.

As the aggregation method in the aggregating unit 1306, the images that have been captured by the image capturing apparatuses are separated into block regions, and the number of actions detected for the block regions including the person positions in the images are counted. In this manner, aggregation results for the action detection are generated by aggregating the action detection results for each block region. This aggregation method will be explained below using FIG. 16.

Figure 16A:
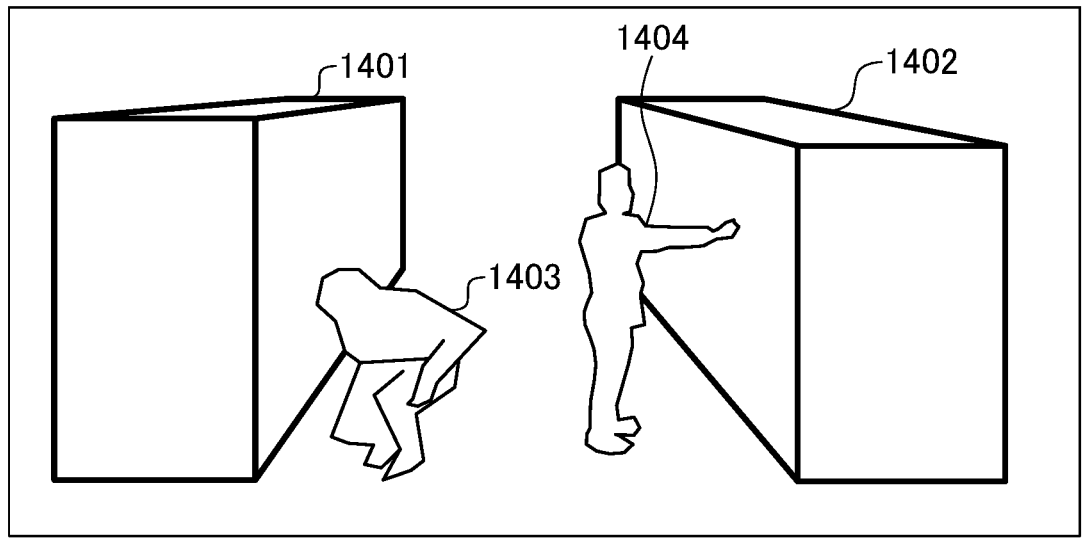
FIG. 16A and FIG. 16B are diagrams showing one example of person action predictions based on a person position in an embodiment.
Figure 16B:
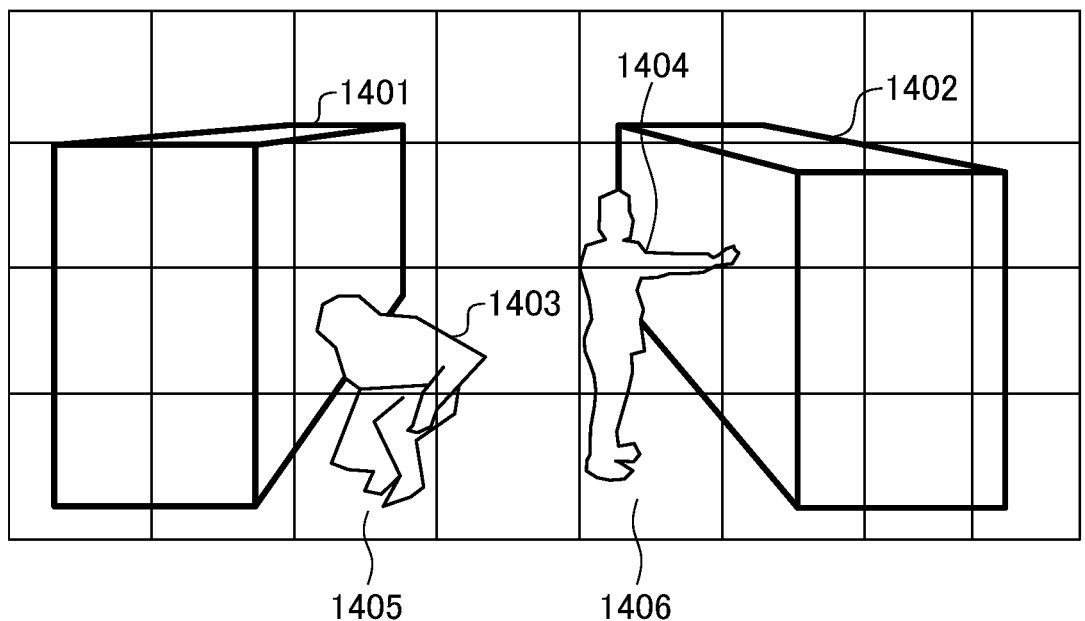

FIG. 16 is a diagram showing one example of a person action prediction by person position in the Third Embodiment. FIG. 16A is an image of a person action inside of a store. FIG. 16B is an image in which the image shown in FIG. 16A has been separated into block regions.

In the image shown in FIG. 16, a person 1403 who is crouching down in front of a product shelf 1401 can be confirmed. The leg positions for this person 1403 are included in a block region 1405, and therefore, the aggregating unit 1306 adds 1 to the crouching down count for this block region 1405. In addition, in the image shown in FIG. 16, a person 1404 who is reaching their hand out in front of the product shelf 1405 can also be confirmed. The leg positions for this person are included in the block region 1406, and therefore, the aggregating unit 1306 adds 1 to the reaching out a hand count for this block region 1406.

Note that the leg position coordinates x1, and y1 for this person, can be calculated using, for example, the following formula (1) from the entire body frame for the tracking (central coordinates x0, y0, width w, height h).

[Formula 1]

$$x1 = x0 \\ y1 = y0 + (h/2)$$

(1)

As the calculation method for a person's feet positions, other than the above Formula (1), for example, from among the right and left ankle positions from the posture estimation results, those for which the y coordinates are large, that is, the ankle positions in the bottom side of the image, may also be used The aggregating unit 1306 stores the above-described aggregation results for the action detection on the fifth storage unit 1307. A person action predicting unit 1301 has the same configuration as the person action predicting unit 204 of the First Embodiment, and reads the action detection aggregation results from the first storage unit 1307. The aggregating unit 1306 uses the aggregation results for the action detection that it has read, and calculates the probability of occurrence for each action in each position for each person for whom actions are predicted based on the action count for each block region.

Specifically, the aggregating unit 1306 makes the sum total for the action count in each block region the denominators, and the action counts for each action in each block region the numerators, and calculates (computes) the probability of occurrence for each action. The probability of occurrence for each action that has been calculated is stored inside the person action predicting unit 1301 as a probability of action occurrence table for each block region. Note that the person action predicting unit 1301 updates the action occurrence tables for each block region each time that a period of time, which was set in advance, has passed. The set time may be set with a unit of several minutes, for example, 5 minutes or the like, or it may also be a unit of several dozen minutes.

The person action predicting unit 1301 reads the probability of action occurrence for blocks including a person position from the probability of action occurrence tables for each block region, and makes this the probability of occurrence of each action for this person. Note that although in this example, aggregation has been performed by the person position, a method may also be used that further performs aggregation for each person orientation in each block region, not just the person positions.

Next, the setting screen for the optimal person orientation for each action for each person and the results confirmation screen will be explained. The action detection results that are stored in the third storage unit 1305 include the person images for the time of detection.

A setting unit 1304 is able to set an optimal person orientation for each action for a person. In addition, the setting unit 1304 reads the images from the time of detection for each action from the third storage unit 1305, and displays them on the display unit 405. Below, an example of a setting screen that is displayed on the display unit 405 will be explained with reference to FIG. 17.

Figure 17A:
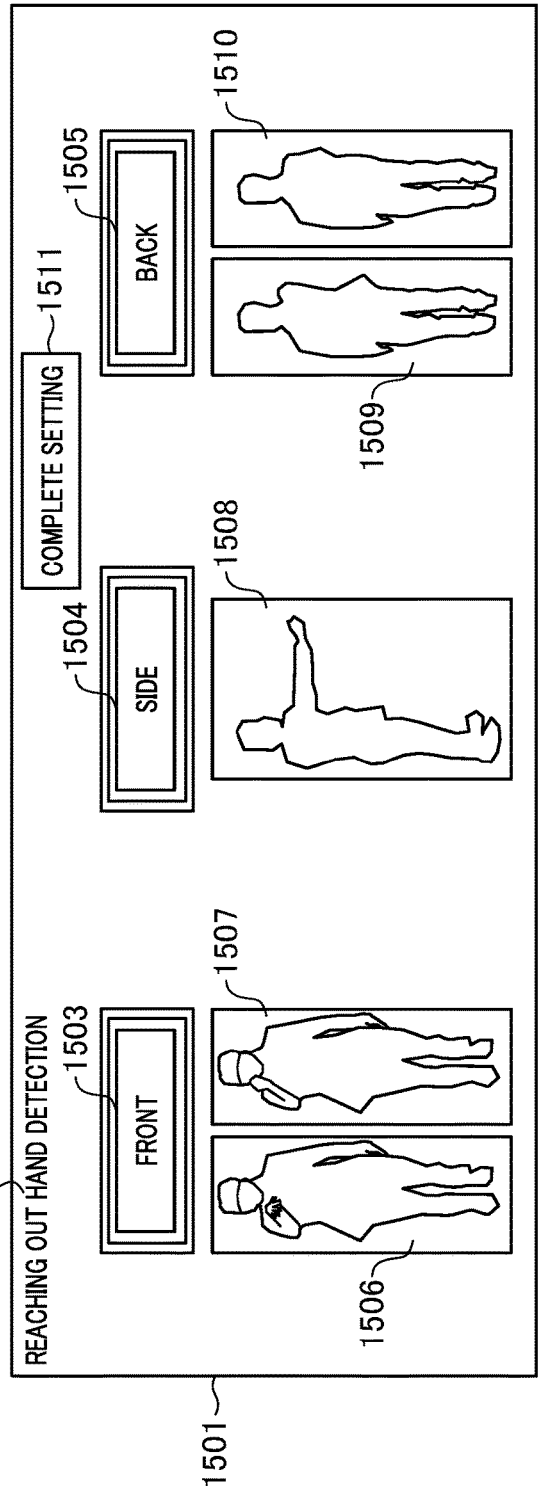
FIG. 17A and FIG. 17B are images of the hand reaching out setting screen in an embodiment.
Figure 17B:
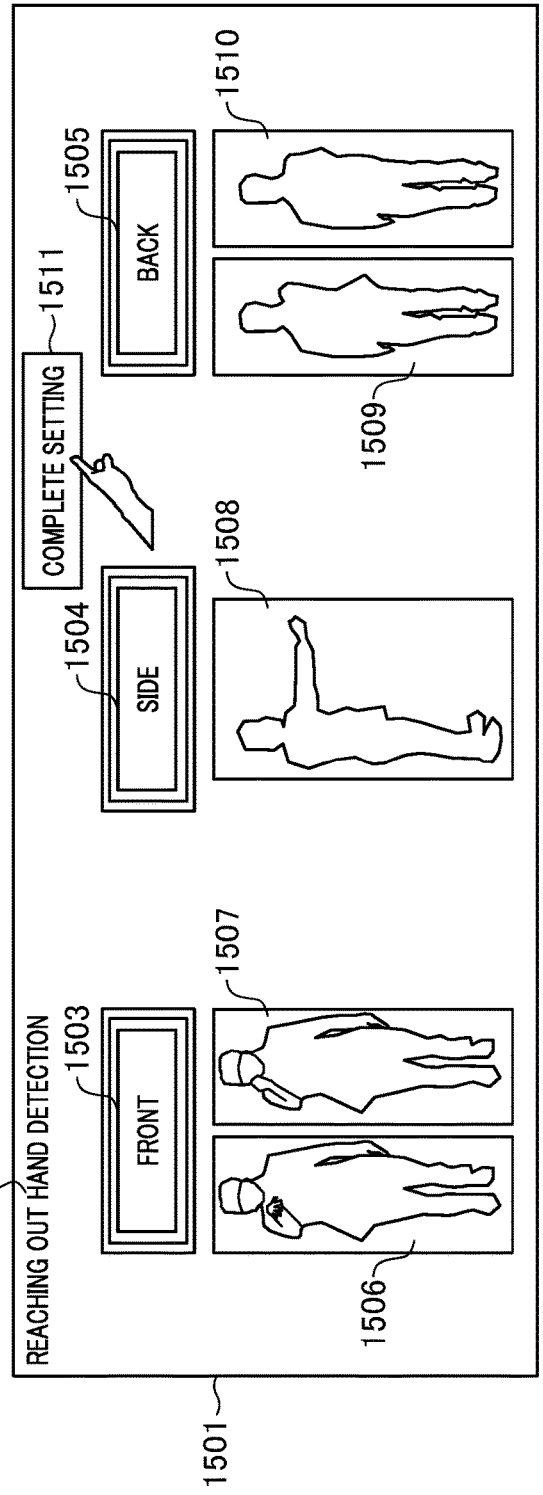

FIG. 17 is an image of a setting screen for reaching out a hand in the Third Embodiment. FIG. 17A is a diagram showing an image of a setting screen, and is a diagram that shows a state in which the detection results images 1506 to 1510 are displayed on the screen, FIG. 17B is a diagram showing an image of a setting screen, and is a diagram showing a state in which the user is touching a button and clearing a selection.

1501 shown in FIG. 17 is an example of a detection setting screen for reaching out a hand. The action name that is being set is shown in 1502. In addition, each of a button 1503 that corresponds to the frontal direction, a button 1504 that corresponds to the sideways direction, and a button 1505 that corresponds to a back direction are disposed on the screen. In addition, each of the detection results images 1506 to 1510 for each orientation are also displayed. The buttons 1503 to 1505 are displayed as being emphasized by being surrounded by a plurality of squares, and this shows that these buttons have been selected. That is, this is in a state in which all of the person orientations, frontal, sideways, and back, have been selected as the optimal person orientations for detecting reaching out a hand.

At this time, if this FIG. 17 is used as an example, the user confirms that the image 1507 for an action that is not reaching out a hand, and the images 1509 and 1510, for which it is unclear if a hand is being reached out, are included by viewing the detection results images 1506 to 1510 from the setting screen that is displayed on the display unit 405. After this, as is shown in FIG. 17B, the user touches the button 1503 and the button 1505, and clears the selection for front and back. The user confirms that only reaching out a hand is detected for the sideways orientation, and does not touch the button 1504, thereby not clearing its selection (it remains selected). After this, the user completes the settings by pressing (clicking, or touching) the settings complete button 1511. The sideways orientation is thereby set as the optimal person orientation for detecting reaching out a hand.

Figure 18:
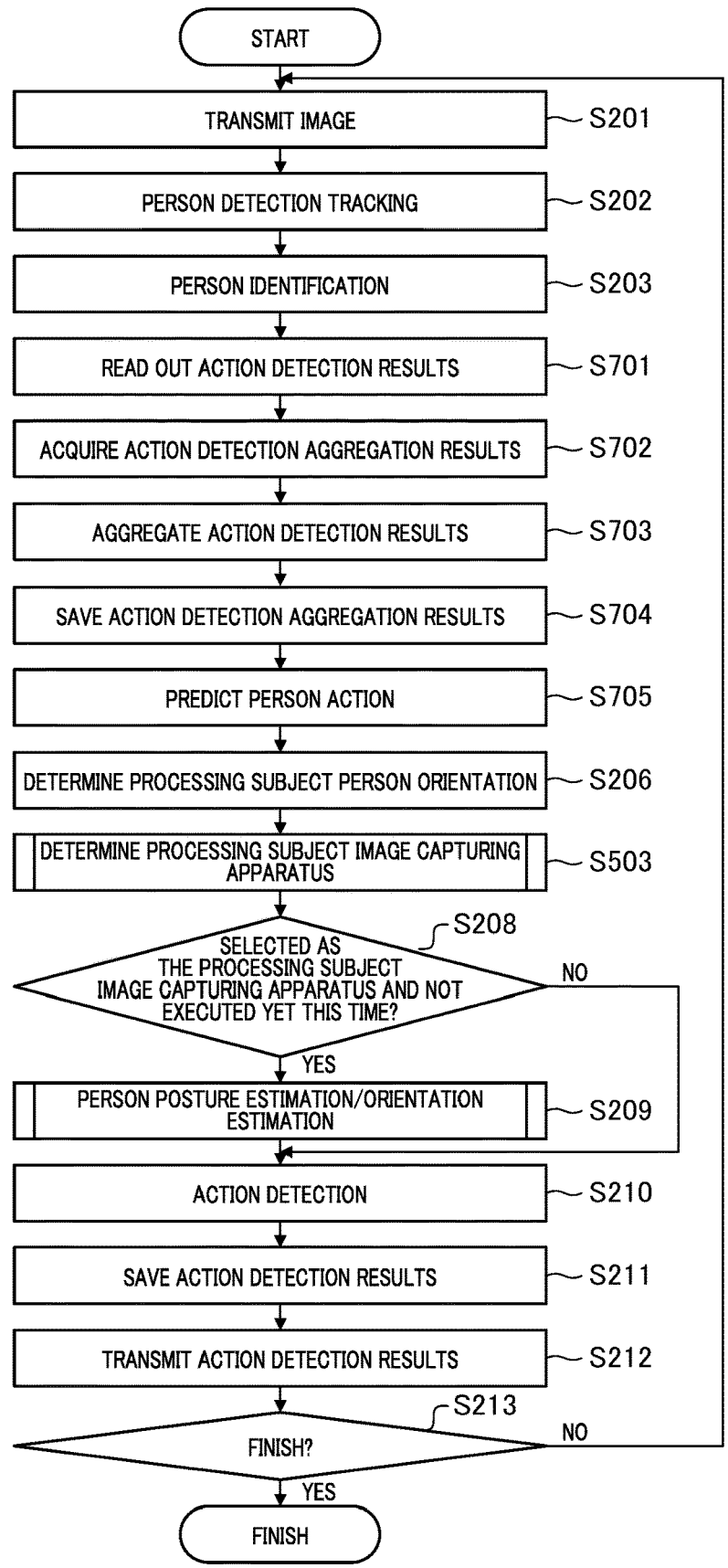
FIG. 18 is a flowchart showing operations of an image processing apparatus in an embodiment.

FIG. 18 is a flowchart showing the operations (processing) for the image processing apparatus 200 in the Third Embodiment. Note that in FIG. 18, the processing that is the same as that in FIG. 9 and FIG. 13 are assigned the same step numbers, and explanations thereof are omitted.

During S701, the aggregating unit 1306 reads out the action detection results from the third storage unit 1305. During S702, the aggregating unit 1306r reads out the past aggregation results from the fifth storage unit 1307. During S703, the aggregating unit 1306 aggregates the action detection results based on the action detection results that have been read out from the third storage unit 1305, and the past aggregation results that have been read out from the fifth storage unit 1307. During S704, the aggregating unit 1306 stores the aggregation results on the fifth storage unit 1307. During S705, the person action predicting unit 1301 reads the action detection aggregation results from the fifth storage nit 1307, and predicts the probability of occurrence for each action for each person who is a processing subject.

Figure 19:
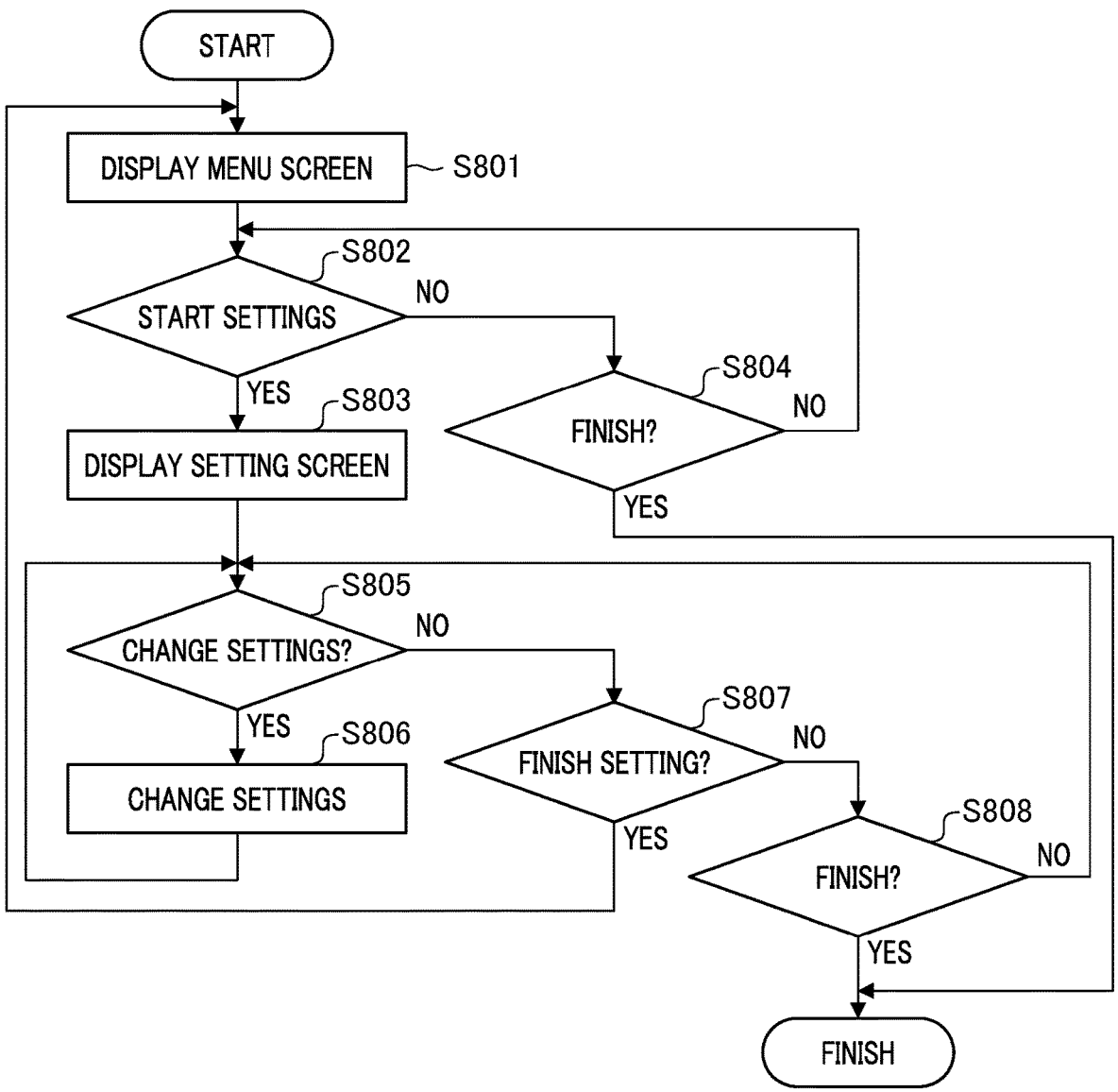
FIG. 19 is a flowchart showing setting operations for an image processing apparatus of an embodiment.

FIG. 19 is flowchart for the setting processing for the optimal person orientation for each action in the image processing apparatus 200.

First, during S801, the setting unit 1304 displays s menu screen on the display unit 405. At this time, the menu screen that is displayed on the display unit 405 displays a selection list for actions to be set, and a commence setting button.

Next, during S802, the setting unit 1304 determines whether or not the commence setting button has been pressed. In the case in which, as the result of the determination, the commence setting button has been pressed, the processing proceeds to S803. In contrast, in the case in which the commence setting button has not been pressed, the processing proceeds to S804.

Next, during S803, the setting unit 1304 reads the current settings from the third storage unit 1305, and displays a settings screen as in FIG. 17A on the upper portion of the screen of the display unit 405. The settings screen that is displayed on the screen of the display unit 405 is a setting screen for the action that has been chosen from the list during S802.

Next, during S804, the setting unit 1304 determines whether or not there is a request to stop. In the case in which, as a result of this determination, there is no request to stop, the processing returns to S802, and the same processing is repeated. In contrast, in the case in which there has been a request to stop, the processing is completed.

Next, during S805, the setting unit 104 determines whether or not there has been an operation to change the settings. In the case in which, as the result of this determination, there has been an operation to change the settings, the processing proceeds to S806. In contrast, in the case in which there has not been an operation to change the settings, the processing proceeds to S807.

Next, during S806, the setting unit 1304 changes the settings in response to the operation, and outputs the changed settings to a sixth storage unit 1303. After this, the processing returns to S805, and the same processing is repeated. The changes to the settings are, changes such as, for example, selecting the front orientation as the optimal person orientation, or removing this from the selections, and the like.

Next, during S807, the setting unit 1304 determines whether or not the settings complete button has been pressed. In the case in which, as the result of this determination, the complete setting button has been pressed, the processing returns to S801, and the same processing is repeated. In contrast, in the case in which the change settings button has not been pressed, the processing proceeds to S808.

Next, during S808, the setting unit 1304 determines whether or not there has been a request to stop. In the case in which, as a result of this determination, there is no request to stop, the processing returns to S805, and the same processing is repeated. In contrast, in the case in which there has been a request to stop, the processing is completed.

Above, in the image processing system of the Third Embodiment, it is possible to display a setting screen for the action predictions according to person position, and the optimal person orientation for each action, and a results confirmation screen on the display unit 405, and it is possible for the user to set the optimal person orientation for each action for a person.

Above, although preferable embodiments of the present invention have been explained above, the present invention is not limited by these embodiments, and various changes and alterations can be made within the scope of the gist thereof. In addition, although a plurality of embodiments have been described above, the present invention can also take the embodiment of a system, apparatus, method, program, recording medium (storage medium), or the like. Specifically, it may also be applied to a system that is configured from a plurality of apparatuses (for example, a host computer, an interface device, an image capturing apparatus, a web application, and the like), and in addition it may also be applied to an apparatus that comprises one device. In addition, it may also be made such that, for example, the functions of the entirety or a portion of each functional unit shown in FIG. 1 are included in an apparatus that is different from the image processing apparatus 200. Specifically, it may be made such that a storage device that is different from the image capturing apparatuses and the image processing apparatus 200 has these functional units, and that the functions of each embodiment are realized by performing communications with the image processing apparatus 200 based on a wired or wireless connection. In addition, it may also be made such that, for example, one or both of the image capturing apparatus 100 and the image capturing apparatus 110 perform at least a portion of the detection processing and the tracking processing for the people, and that these results are provided to the image processing apparatus 200 along with the captured images. In the same manner, it may also be made such that one or more of the functional units in FIG. 1 are realized by one or more computers that are different from the image processing apparatus 200. In addition, it may also be made such that the image processing apparatus 200 has image capturing functions that are equivalent to those of the image capturing apparatus 100 and the image capturing apparatus 110. In this case, the present invention can be configured such that, for example image processing apparatus 200 has the above-described image capturing unit and image transmission unit. In addition, it may also be made such that a portion of or all of the functions of each functional unit shown in FIG. 1 is had by one or more apparatuses that are different from the image processing apparatus 200, and it is also possible for the image processing apparatus 200 to have image capturing capabilities in addition to all of the functions of FIG. 1. The same also applies to FIG. 12 and FIG. 15. In addition, the plurality of image capturing apparatuses that are used for detecting people and the plurality of image capturing apparatuses that serve as the candidates for the optimal image capturing apparatuses do not necessarily need to perfectly correspond to each other. For example, image capturing apparatuses that are used only for detection processing and action prediction for people may also exist in the system.

In addition, it also goes without saying that the aim of the present invention could also be achieved in the following manner. That is, a recording medium (or a storage medium) on which a software program code (a computer program) for realizing the functions of the above-explained examples has been recorded is provided to the system or the apparatus. It also goes without saying that the related storage medium is a computer readable storage medium. In addition, the computer (or CPU or MPU) of this system or apparatus reads out an executes the program code that has been stored on the recording medium. In this case, the program code itself that has been read out from the recording medium executes the functions of the above-described examples, and the recording medium on which this program code has been recorded configures the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-081817, May 18, 2022, which is hereby incorporated by reference herein in its entirety

What is claimed is:

1. An image processing apparatus comprising:
one or more memories storing instructions; and
one or more processors executing the instructions to:
predict a plurality of actions of a person who has been detected from images captured by an image capturing apparatus;
determine an orientation of the person based on the action prediction results for each action, and ascertain an ideal orientation of the person suitable for detecting a motion in the predicted action with a highest probability;
select, from among a plurality of image capturing apparatuses, an optimal image capturing apparatus for detecting future actions of the person, wherein the optimal capturing apparatus is selected when the orientation of the person in the images captured by said apparatus most closely matches the ascertained ideal orientation of the same person ascertained from said predicted results; and
detect the future actions of the person based on images that have been captured by the optimal image capturing apparatus.

2. The image processing apparatus according to claim 1, wherein, the one or more processors select, from among the plurality of image capturing apparatuses, an image capturing apparatus that captures images of the person from an angle that is closest to the determined person orientation to serve as the optimal image capturing apparatus.

3. The image processing apparatus according to claim 1, wherein the one or more processors are configured to determine the person orientation based further on posture estimation results that have been posture estimated for the person.

4. The image processing apparatus according to claim 3, wherein the one or more processors are configured to detect actions of the person based on the posture estimation results, the person orientation, and tracking information for the person in the images captured by the optimal image capturing apparatus.

5. The image processing apparatus according to claim 3, wherein, in the case in which the difference for the person orientation for two or more image capturing apparatuses is less than a threshold, the one or more processors are configured to select an image capturing apparatus that has captured an image of the person in which the person is least hidden in the captured images from among the two or more image capturing apparatuses.

6. The image processing apparatus according to claim 5, wherein the one or more processors are configured to determine that the person is least hidden in the case in which there is a high human body detection likelihood in the posture estimation results.

7. The image processing apparatus according to claim 1, wherein the one or more processors are configured to acquire a resource usage state of the image processing apparatus, and select a plurality of image processing apparatuses to serve as the optimal image capturing apparatus for the person according to the resource usage state.

8. The image processing apparatus according to claim 1, wherein, in the case in which an action that is different from the action that has been predicted has been detected based on an image captured by the optimal image capturing apparatus, the one or more processors are configured adjust a prediction method for an action so as to increase the probability of occurrence for the different action.

9. The image processing apparatus according to claim 2, wherein the one or more processors are configured to generate aggregation results by aggregating detection results for actions for a person for each separated region in which an image that has been captured by the plurality of image capturing apparatuses has been separated into a plurality of regions.

10. The image processing apparatus according to claim 9, wherein the one or more processors are configured to predict the actions of the person by using the aggregation results for separated regions to which the person who is the prediction subject for the action belongs.

11. The image processing apparatus according to claim 1, wherein the person orientation is at least one from among a facial orientation, a body orientation, or a hand orientation.

12. The image processing apparatus according to claim 1, wherein the one or more processors are configured to select the optimal image capturing apparatus based on a person orientation corresponding to an action of the person for which the probability of occurrence is predicted to be higher.

13. The image processing apparatus according to claim 1, wherein the one or more processors are configured to predict a probability of occurrence for each of a plurality of person orientations, and to select the optimal image capturing apparatus based on a person orientation for which the probability of occurrence is higher.

14. The image processing apparatus according to claim 1, wherein the one or more processors are configured to set the person orientation of an action for each action of the person.

15. The image processing apparatus according to claim 14, wherein the one or more processors are configured to display an image from a time of action detection for each person orientation on a settings screen of a display apparatus.

16. The image processing apparatus according to claim 1, wherein the one or more processors are configured to select at least one image capturing apparatus to serve as the optimal image capturing apparatus for one person from the plurality of image capturing apparatuses according to a number of a person who are made subjects of action detection.

17. A control method of an image processing apparatus, wherein the control method comprises:
predicting a plurality of actions of a person who has been detected from images captured by an image capturing apparatus;
determining an orientation of the person based on the action prediction results for each action, and ascertain an ideal orientation of the person suitable for detecting a motion in the predicted action with a highest probability;
selecting, from among a plurality of image capturing apparatuses, an optimal image capturing apparatus for detecting future actions of the person, wherein the optimal capturing apparatus is selected when the orientation of the person in the images captured by said apparatus most closely matches the ascertained ideal orientation of the same person ascertained from said predicted results; and
detecting the future actions of the person based on images that have been captured by the optimal image capturing apparatus.

18. A non-transitory computer-readable storage medium configured to store a computer program comprising instructions for executing following processes:
predicting a plurality of actions of a person who has been detected from images captured by an image capturing apparatus;
determining an orientation of the person based on the action prediction results for each action, and ascertain an ideal orientation of the person suitable for detecting a motion in the predicted action with a highest probability;
selecting, from among a plurality of image capturing apparatuses, an optimal image capturing apparatus for detecting future actions of the person, wherein the optimal capturing apparatus is selected when the orientation of the person in the images captured by said apparatus most closely matches the ascertained ideal orientation of the same person ascertained from said predicted results; and
detecting the future actions of the person based on images that have been captured by the optimal image capturing apparatus.

19. An image processing system comprising an image processing apparatus, and a plurality of image capturing apparatuses that are communicatively connected to the image processing apparatus, wherein
the image processing apparatus that is included in the image processing system has:
at least one memory storing instructions; and
one or more processors configured to execute the instructions, which when executed by the one or more processors, cause the image processing apparatus to:
predict a plurality of actions of a person who has been detected from images captured by one or more image capturing apparatuses from among the plurality of image capturing apparatuses;
determine an orientation of the person based on the action prediction results for each action, and ascertain an ideal orientation of the person suitable for detecting a motion in the predicted action with a highest probability;
select, from among a plurality of image capturing apparatuses, an optimal image capturing apparatus for detecting future actions of the person, wherein the optimal capturing apparatus is selected when the orientation of the person in the images captured by said apparatus most closely matches the ascertained ideal orientation of the same person ascertained from said predicted results; and
detect the future actions of the person based on images that have been captured by the optimal image capturing apparatus;
and wherein, the plurality of image capturing apparatuses included in the image processing system has:
an image capturing unit configured to capture the images; and a transmission unit configured to transmit the captured images to the image processing apparatus.

20. The image processing system according to claim 19, wherein the plurality of image capturing apparatuses are each disposed such that at least one of a disposure position or a disposure angle of each of the image capturing apparatuses is different.

* * * * *